US011702061B2

(12) United States Patent
Kikuchi et al.

(10) Patent No.: US 11,702,061 B2
(45) Date of Patent: Jul. 18, 2023

(54) HYBRID VEHICLE, DRIVE CONTROL SYSTEM, AND METHOD FOR CONTROLLING HYBRID VEHICLE

(71) Applicant: TOYOTA JIDOSHA KABUSHIKI KAISHA, Toyota (JP)

(72) Inventors: Yoshiaki Kikuchi, Toyota (JP); Junichi Matsumoto, Toyota (JP); Akio Uotani, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 359 days.

(21) Appl. No.: 17/087,273

(22) Filed: Nov. 2, 2020

(65) Prior Publication Data

US 2021/0188241 A1 Jun. 24, 2021

(30) Foreign Application Priority Data

Dec. 19, 2019 (JP) .................................. 2019-229541

(51) Int. Cl.
*B60W 20/13* (2016.01)
*B60W 30/19* (2012.01)
*B60W 20/15* (2016.01)

(52) U.S. Cl.
CPC ............ *B60W 20/13* (2016.01); *B60W 20/15* (2016.01); *B60W 30/19* (2013.01); *B60W 2510/10* (2013.01)

(58) Field of Classification Search
CPC combination set(s) only.
See application file for complete search history.

(56) References Cited

U.S. PATENT DOCUMENTS 7,174,979 B2  2/2007  Ohta et al.
8,303,467 B2  11/2012 Iwase et al.
(Continued)

FOREIGN PATENT DOCUMENTS

EP  2 363 329 A1  9/2011
JP  2010-273520 A  12/2010
(Continued)

OTHER PUBLICATIONS

Ewert Energy Systems Inc, P0A01-Pack Voltage Sensor Fault, 2018, https://www.orionbms.com/troubleshooting/p0a01-pack-voltage-sensor-fault/, pp. 1 (Year: 2018).*

*Primary Examiner* — Aniss Chad
*Assistant Examiner* — Chase L Cooley
(74) *Attorney, Agent, or Firm* — Oliff PLC

(57) ABSTRACT

A hybrid vehicle includes: an engine; a battery; a power converter; a relay; a first controller; and a second controller. The second controller is configured to control the engine and the power converter according to allowable charging power and allowable discharging power received from the first controller. The second controller has, as control modes, a normal mode in which the relay is closed and the battery and the power converter are electrically connected and a batteryless drive mode in which the relay is opened to cause the hybrid vehicle to move with the battery electrically disconnected from the power converter. The second controller is configured to select the batteryless drive mode when at least one of the magnitude of the allowable charging power and the magnitude of the allowable discharging power become smaller than a first predetermined value.

6 Claims, 17 Drawing Sheets

(56) References Cited

U.S. PATENT DOCUMENTS

| | | |
|---|---|---|
| 9,260,112 B2 | 2/2016 | Kimura |
| 2010/0094493 A1* | 4/2010 | Atsumi ................. B60W 10/06 |
| | | 123/519 |
| 2010/0110594 A1* | 5/2010 | Walters ................ B60L 15/025 |
| | | 903/930 |
| 2015/0217756 A1* | 8/2015 | Kitabatake ............ B60W 20/13 |
| | | 180/65.265 |
| 2016/0229309 A1 | 8/2016 | Mitsutani |
| 2019/0265302 A1* | 8/2019 | Wang ................... G01R 31/389 |
| 2019/0351892 A1 | 11/2019 | Tsuda |

FOREIGN PATENT DOCUMENTS

| | | |
|---|---|---|
| JP | 2013-103514 A | 5/2013 |
| JP | 2013-123941 A | 6/2013 |
| JP | 2016-147517 A | 8/2016 |
| JP | 2019-156007 A | 9/2019 |

* cited by examiner

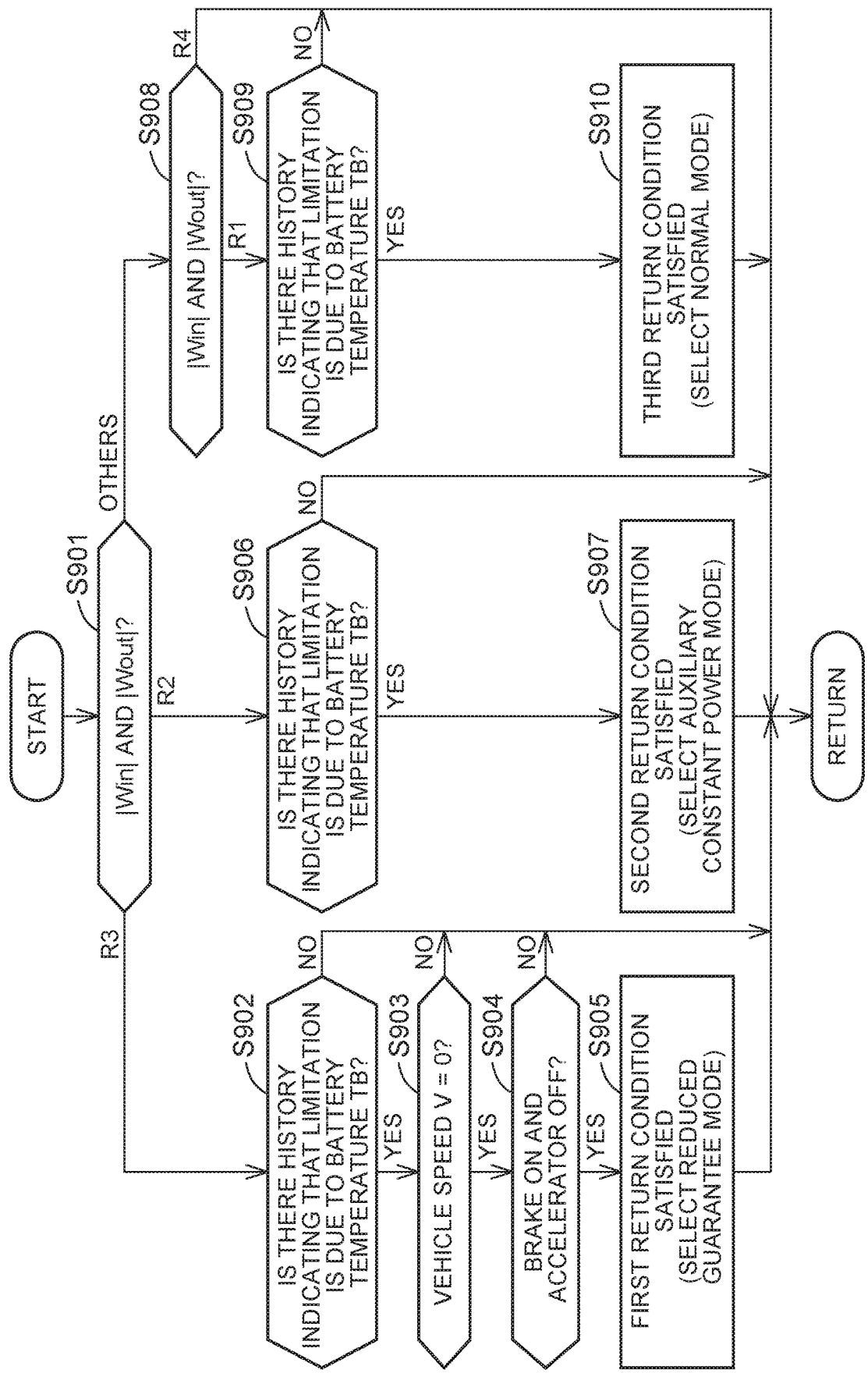

_HYBRID VEHICLE, DRIVE CONTROL SYSTEM, AND METHOD FOR CONTROLLING HYBRID VEHICLE_

CROSS-REFERENCE TO RELATED APPLICATION

This application claims priority to Japanese Patent Application No. 2019-229541 filed on Dec. 19, 2019, incorporated herein by reference in its entirety.

BACKGROUND

1. Technical Field

The present disclosure relates to hybrid vehicles, drive control systems, and methods for controlling a hybrid vehicle.

2. Description of Related Art

Hybrid vehicles (HVs) have been increasingly popular in recent years. Electrically driven vehicles can include hybrid vehicles, electric vehicles (EVs), etc. Typical hybrid vehicles are equipped with separate electronic control units (ECUs) for each function. For example, a hybrid vehicle disclosed in Japanese Unexamined Patent Application Publication No. 2019-156007 (JP 2019-156007 A) includes an engine ECU, a motor ECU, a battery ECU, and an HVECU. The HVECU is connected to the engine ECU, the motor ECU, and the battery ECU via a communication port and sends and receives various control signals and data to and from the engine ECU, the motor ECU, and the battery ECU.

SUMMARY

It is herein assumed that a hybrid vehicle is equipped with a battery pack and a drive control system. An ECU in the battery pack and an ECU in the drive control system are configured to communicate with each other.

The battery pack includes a battery and manages the state of the battery. Specifically, the ECU in the battery pack calculates allowable charging power of the battery and allowable discharging power of the battery and outputs the calculation results to the drive control system.

The drive control system includes an engine and two rotating electrical machines (a motor and a generator) and generally controls traveling of the hybrid vehicle. Specifically, the ECU in the drive control system controls the engine or controls the two rotating electrical machines, based on data on the allowable charging power and the allowable discharging power of the battery received from the ECU in the battery pack.

The automotive industry is said to have a vertically integrated industrial structure. However, since hybrid vehicles will become more popular around the world, the automotive industry may increasingly shift toward horizontal specialization. The inventors focused on the following possible problem associated with this shift of the industrial structure.

There may be a situation where a battery pack company (hereinafter referred to as Company A) and a drive control system company (hereinafter referred to as Company B) are different. For example, Company B sells drive control systems to Company A. Company A develops hybrid vehicles using the driving control systems purchased from Company B and battery packs designed (procured) by Company A. Especially in such a situation, compatibility between the battery pack and the drive control system can be a problem.

This will be described more specifically. As described above, the data on the allowable charging power and the allowable discharging power of the battery is sent from the ECU in the battery pack to the ECU in the drive control system. For example, in the case where Company A and Company B have different understandings about the content, timing, etc. of communication or in the case where coordination between Companies A and B about communication is not enough, there is a possibility that data different from data expected by the drive control system may be sent from the ECU in the battery pack to the ECU in the drive control system as the data on the allowable charging power and the allowable discharging power of the battery. Specifically, there is a possibility that the ECU in the battery pack may set the allowable charging power and the allowable discharging power to excessively small values (e.g., values close to 0). In this case, the drive control system may reduce charging and discharging of the battery even though it is still not actually necessary to protect the battery. As a result, the hybrid vehicle may become unable to move.

The present disclosure provides a hybrid vehicle, a drive control system, and a method for controlling a hybrid vehicle that can make the hybrid vehicle move even when there is a problem with communication between two ECUs.

A hybrid vehicle according to a first aspect of the present disclosure includes: an engine; a first rotating electrical machine; a second rotating electrical machine connected to a drive wheel via an output shaft; a planetary gear set; a battery; a power converter configured to convert electric power among the battery, the first rotating electrical machine, and the second rotating electrical machine; a relay electrically connected between the battery and the power converter; and first and second controllers. The planetary gear set is configured to mechanically couple the engine, the first rotating electrical machine, and the output shaft and is configured to transmit torque among the engine, the first rotating electrical machine, and the output shaft. The first controller is configured to calculate allowable charging power of the battery and allowable discharging power of the battery and output the calculation results. The second controller is configured to control the engine and the power converter according to the allowable charging power and the allowable discharging power received from the first controller. The second controller has, as control modes, a normal mode in which the relay is closed and the battery and the power converter are electrically connected and a batteryless drive mode in which the relay is opened to cause the hybrid vehicle to move with the battery electrically disconnected from the power converter. The second controller is configured to select the batteryless drive mode when at least one of magnitude of the allowable charging power and magnitude of the allowable discharging power become smaller than a first predetermined value.

In the hybrid vehicle of the first aspect of the present disclosure, the second controller may be configured to select the batteryless drive mode when at least one of the magnitude of the allowable charging power and the magnitude of the allowable discharging power become smaller than the first predetermined value due to a problem with communication between the first controller and the second controller.

According to the hybrid vehicle of the first aspect of the present disclosure, the second controller receives the allowable charging power and the allowable discharging power of the battery from the first controller. When the magnitude of the allowable charging power becomes smaller than the first predetermined value or the magnitude of the allowable discharging power becomes smaller than the first predetermined value during the normal mode of the hybrid vehicle, the second controller switches the control mode of the hybrid vehicle to the batteryless drive mode regardless of whether this decrease in magnitude of the allowable charging power or magnitude of the allowable discharging power is due to the state of the battery (e.g., due to an excessive increase or decrease in temperature of the battery) or due to communication between the first and second controllers. The hybrid vehicle can thus be made to move even when there is a problem with communication between the first and second controllers.

In the hybrid vehicle of the first aspect of the present disclosure, the second controller may be configured to cancel the batteryless drive mode when all of the following conditions are satisfied: (i) it is no longer the case that at least one of the magnitude of the allowable charging power and the magnitude of the allowable discharging power are smaller than the first predetermined value, (ii) the hybrid vehicle is stopped, and (iii) an accelerator pedal of the hybrid vehicle is not being operated.

When the batteryless drive mode is cancelled (e.g., when the control mode of the hybrid vehicle is switched back to the normal mode), the relay is closed and the battery and the power converter are electrically connected again. It is therefore desirable to avoid canceling the batteryless drive mode while the vehicle is moving (or when there is a possibility that the vehicle may move). According to the hybrid vehicle of the first aspect of the present disclosure, the second controller cancels the batteryless drive mode after confirming that the hybrid vehicle is completely stopped as well as checking the magnitude of the power. This configuration can prevent an abnormality from occurring when, e.g., the control mode of the hybrid vehicle is switched back to the normal mode.

The hybrid vehicle of the first aspect of the present disclosure may further include: an auxiliary load; a DC-to-DC converter electrically connected between the relay and the auxiliary load; and an auxiliary battery configured to supply electric power to the auxiliary load. The second controller may be configured to perform constant voltage control of the DC-to-DC converter during the normal mode. The second controller may further have, as the control mode, a constant power mode in which the second controller performs constant power control of the DC-to-DC converter. The second controller may be configured to select the constant power mode when at least one of the magnitude of the allowable charging power and the magnitude of the allowable discharging power becomes smaller than a second predetermined value that is equal to or larger than the first predetermined value.

According to the hybrid vehicle of the first aspect of the present disclosure, the second controller further has the constant power mode in which the second controller performs the constant power control of the DC-to-DC converter. As described in detail later, by selecting the constant power mode, the voltage of the auxiliary battery may fluctuate with fluctuations in power consumption of the auxiliary load, but a change in charging and discharging power of the battery with fluctuations in electric power of the auxiliary load is reduced. The battery whose charging and discharging are relatively severely limited due to at least one of the allowable charging power and the allowable discharging power having become smaller than the second predetermined value can thus be more reliably protected.

In the hybrid vehicle of the first aspect of the present disclosure, the second controller may be configured to guarantee during the normal mode that a driving force that is output from the hybrid vehicle is controlled to a requested driving force by adjusting torque of the engine, torque of the first rotating electrical machine, and torque of the second rotating electrical machine. The second controller may further have, as the control mode, a reduced guarantee mode in which the second controller less strictly guarantees that the driving force is controlled to the requested driving force than in the normal mode. The second controller may be configured to select the reduced guarantee mode when at least one of the magnitude of the allowable charging power and the magnitude of the allowable discharging power become smaller than a third predetermined value that is equal to or larger than the first predetermined value.

According to the hybrid vehicle of the first aspect of the present disclosure, the second controller further has the reduced guarantee mode in which the second controller less strictly guarantees the requested driving force than in the normal mode. As described in detail later, by selecting the reduced guarantee mode, an error in actual driving force may occur due to an error in engine power associated with fluctuations in engine combustion state, but a change in charging and discharging power of the battery associated with the error in engine power is reduced. The battery whose charging and discharging are relatively severely limited due to at least one of the allowable charging power and the allowable discharging power having become smaller than the third predetermined value can thus be more reliably protected.

A drive control system according to a second aspect of the present disclosure is configured to control traveling of a hybrid vehicle equipped with a battery. The hybrid vehicle includes a first controller configured to calculate allowable charging power of the battery and allowable discharging power of the battery and output the calculation results. The drive control system includes: an engine; a first rotating electrical machine; a second rotating electrical machine connected to a drive wheel via an output shaft; a planetary gear set; a power converter configured to convert electric power among the battery, the first rotating electrical machine, and the second rotating electrical machine; and a second controller. The planetary gear set is configured to mechanically couple the engine, the first rotating electrical machine, and the output shaft and is configured to transmit torque among the engine, the first rotating electrical machine, and the output shaft. The second controller is configured to control the power converter according to the allowable charging power and the allowable discharging power received from the first controller. The second controller has, as a control mode, a batteryless drive mode in which a relay electrically connected between the battery and the power converter is opened to cause the hybrid vehicle to move with the battery electrically disconnected from the power converter. The second controller is configured to select the batteryless drive mode when at least one of magnitude of the allowable charging power and magnitude of the allowable discharging power become smaller than a predetermined value.

According to the drive control system of the second aspect of the present disclosure, as in the first aspect, the hybrid vehicle can be made to move even when there is a problem with communication between the first and second controllers.

In a method for controlling a hybrid vehicle according to a third aspect of the present disclosure, the hybrid vehicle includes an engine, a first rotating electrical machine, a second rotating electrical machine connected to a drive wheel via an output shaft, a planetary gear set, a battery, a power converter configured to convert electric power among the battery, the first rotating electrical machine, and the second rotating electrical machine, a relay electrically connected between the battery and the power converter, and first and second controllers. The planetary gear set is configured to mechanically couple the engine, the first rotating electrical machine, and the output shaft and is configured to transmit torque among the engine, the first rotating electrical machine, and the output shaft. The first controller is configured to calculate allowable charging power of the battery and allowable discharging power of the battery and output the calculation results. The second controller is configured to control the engine and the power converter according to the allowable charging power and the allowable discharging power received from the first controller. The second controller is configured to perform batteryless drive control in which the relay is opened to cause the hybrid vehicle to move with the battery electrically disconnected from the power converter. The method includes: performing the batteryless drive control by the second controller when at least one of magnitude of the allowable charging power and magnitude of the allowable discharging power become smaller than a predetermined value.

According to the method of the third aspect of the present disclosure, as in the first and second aspects of the present disclosure, the hybrid vehicle can be made to move even when there is a problem with communication between the first and second controllers.

According to the first, second, and third aspects of the present disclosure, the hybrid vehicle can be made to move even when there is a problem with communication between the first and second controllers.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 18 is a flowchart illustrating an example of a process for determination of whether a return condition is satisfied according to the third embodiment.

DETAILED DESCRIPTION OF EMBODIMENTS

Embodiments of the present disclosure will be described in detail with reference to the drawings. The same or corresponding parts are denoted with the same signs throughout the figures and description thereof will not be repeated.

First Embodiment

Overall Configuration of Hybrid Vehicle

Figure 1:
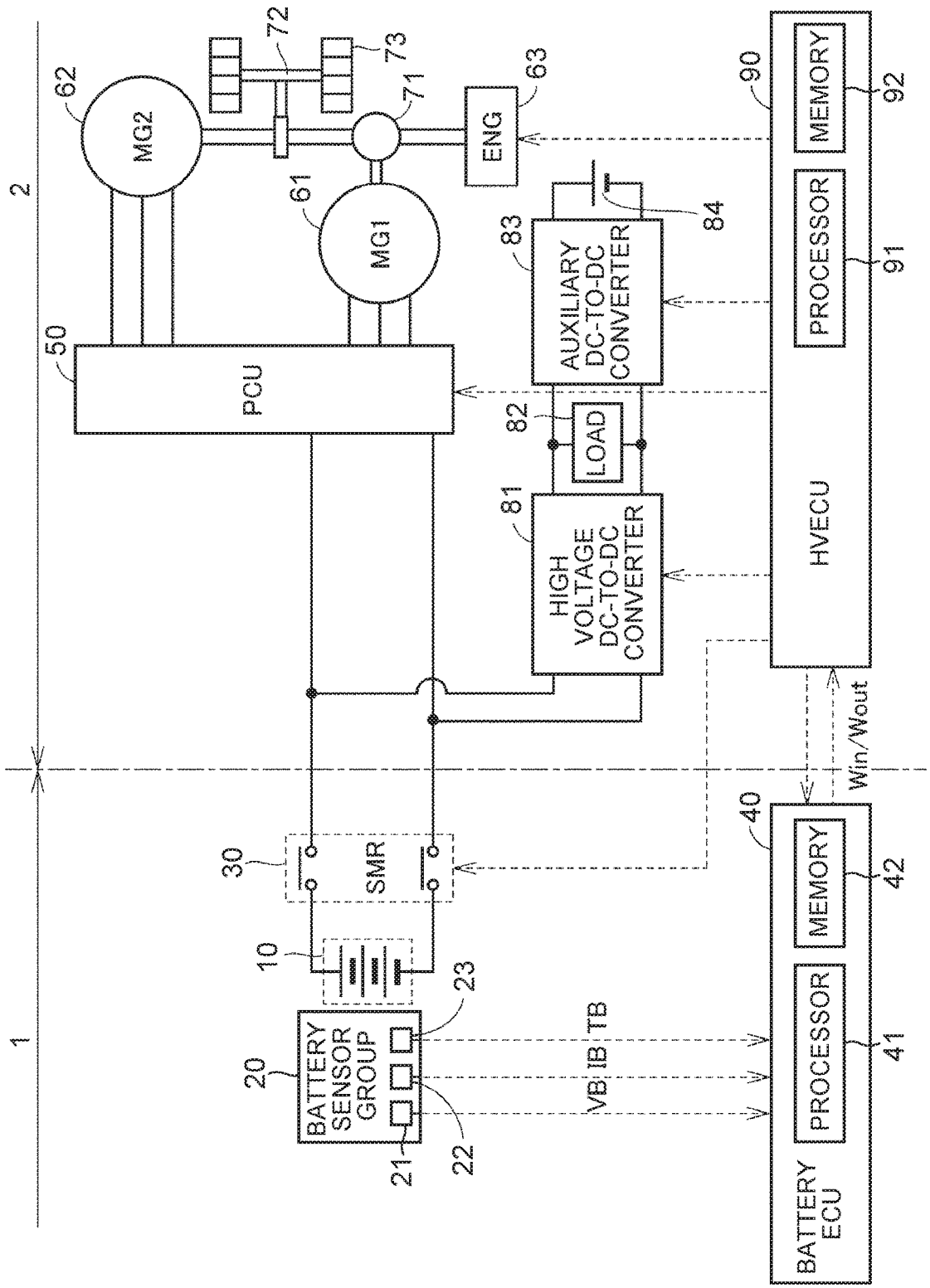
FIG. 1 schematically illustrates the overall configuration of a hybrid vehicle according to a first embodiment.

FIG. 1 schematically illustrates the overall configuration of a hybrid vehicle according to the first embodiment. Referring to FIG. 1, a vehicle 100 is a hybrid vehicle and includes a battery pack 1 and an HV system 2. The HV system 2 can be regarded as the "drive control system" according to the present disclosure.

The battery pack 1 includes a battery 10, a battery sensor group 20, a system main relay (SMR) 30, and a battery ECU 40. The HV system 2 includes a power control unit (PCU) 50, a first motor generator (MG1) 61, a second motor generator (MG2) 62, an engine 63, a power split device 71, a drive shaft 72, drive wheels 73, a high voltage DC-to-DC converter 81, a load 82, an auxiliary DC-to-DC converter 83, an auxiliary battery 84, and an HVECU 90.

The battery 10 includes a battery pack composed of a plurality of cells. Each cell is a secondary cell such as a lithium ion cell or a nickel-metal hydride cell. The battery 10 stores electric power for driving the first motor generator 61 and the second motor generator 62 and supplies electric power to the first motor generator 61 and the second motor generator 62 through the PCU 50. When the first motor generator 61 and the second motor generator 62 generate electric power, the battery 10 is charged with the generated electric power through the PCU 50.

The battery sensor group 20 includes a voltage sensor 21, a current sensor 22, and a temperature sensor 23. The voltage sensor 21 detects the voltage of each cell in the battery 10. The current sensor 22 detects a current IB that is input and output to and from the battery 10. The temperature sensor 23 detects the temperature TB of the battery 10

(hereinafter also referred to as the "battery temperature TB"). Each sensor outputs its detection results to the battery ECU 40.

The SMR 30 is electrically connected to power lines that connect the battery 10 and the PCU 40. The SMR 30 electrically connects or disconnects the PCU 40 to and from the battery 10 in response to a control command from the HVECU 90. The SMR 30 can be regarded as the "relay" according to the present disclosure.

The battery ECU 40 includes a processor 41 such as a central processing unit (CPU), a memory 42 such as a read only memory (ROM) and a random access memory (RAM), and input and output ports (not shown) for receiving and outputting various signals. The battery ECU 40 monitors the state of the battery 10 based on signals received from the sensors of the battery sensor group 20 and programs and maps stored in the memory 42.

Main processes that are executed by the battery ECU 40 include a process of calculating allowable charging power Win and allowable discharging power Wout of the battery 10. The allowable charging power Win is an upper control limit of the charging power of the battery 10 and is set to Win≤0. When the allowable charging power Win is set to Win=0, it means that charging of the battery 10 is prohibited. Similarly, the allowable discharging power Wout is an upper control limit of the discharging power of the battery 10 and is set to Wout≥0. When the allowable discharging power Wout is set to Wout=0, it means that discharging of the battery 10 is prohibited. The process of calculating the allowable charging power Win and the allowable discharging power Wout will be described later in detail with reference to FIG. 6.

The PCU 50 bidirectionally converts electric power between the battery 10 and the first and second motor generators 61, 62 or between the first motor generator 61 and the second motor generator 62 according to a control command from the HVECU 90. The PCU 50 is configured so that it can independently control the states of the first motor generator 61 and the second motor generator 62. For example, the PCU 50 can cause the second motor generator 62 to perform power running while causing the first motor generator 61 to regenerate (generate power). The PCU 50 includes, e.g., two inverters (not shown) for the first motor generator 61 and the second motor generator 62 and a converter (not shown) that boosts a direct current (DC) voltage to be supplied to each inverter to a voltage equal to or higher than an output voltage of the battery 10. The PCU 50 can be regarded as the "power converter" according to the present disclosure.

Each of the first motor generator 61 and the second motor generator 62 is an alternating current (AC) rotating electrical machine and is, e.g., a three-phase AC synchronous motor having permanent magnets embedded in a rotor. The first motor generator 61 can be regarded as the "first rotating electrical machine" according to the present disclosure. The second motor generator 62 can be regarded as the "second rotating electrical machine" according to the present disclosure.

The first motor generator 61 is mainly used as a generator that is driven by the engine 63 via the power split device 71. Electric power generated by the first motor generator 61 is supplied to the second motor generator 62 or the battery 10 via the PCU 50. The first motor generator 61 can also crank the engine 63.

The second motor generator 62 mainly operates as an electric motor and drives the drive wheels 73. The second motor generator 62 is driven by at least one of the electric power from the battery 10 and the electric power generated by the first motor generator 61, and the driving force of the second motor generator 62 is transmitted to the drive shaft (output shaft) 72. When braking the vehicle or when reducing acceleration on a downhill slope, the second motor generator 62 operates as a generator for regeneration. The electric power generated by the second motor generator 62 is supplied to the battery 10 via the PCU 50.

The engine 63 outputs power by converting combustion energy generated by combustion of an air-fuel mixture to kinetic energy of a moving element such as a piston or a rotor.

The power split device 71 is a planetary gear set. Although not shown in the figure, the power split device 71 includes a sun gear, a ring gear, pinion gears, and a carrier. The carrier is coupled to the engine 63. The sun gear is coupled to the first motor generator 61. The ring gear is coupled to the second motor generator 62 and the drive wheels 73 via the drive shaft 72. The pinion gears mesh with the sun gear and the ring gear. The carrier holds the pinion gears such that the pinion gears can rotate and revolve.

Figure 2:
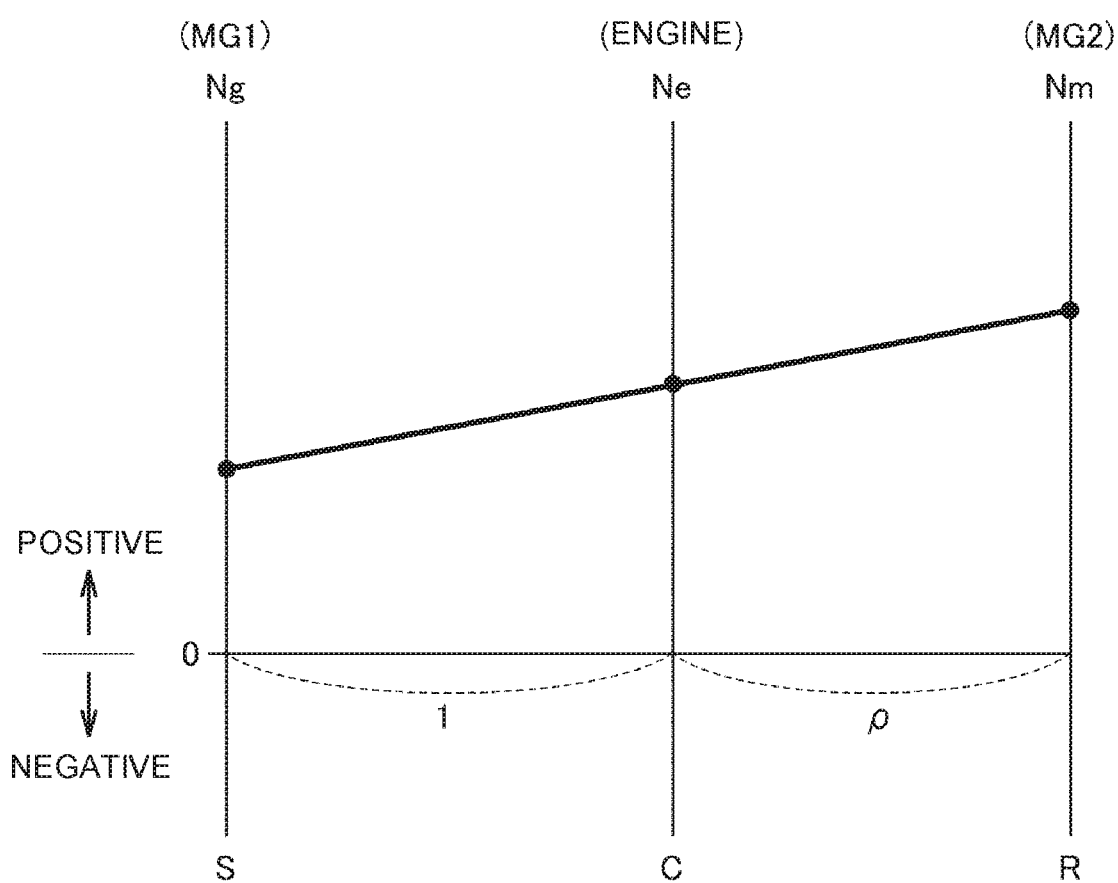
FIG. 2 is a nomographic chart of a power split device.

FIG. 2 is a nomographic chart of the power split device 71. Since the power split device 71 is configured as described above, a first MG rotational speed Nm1 (the rotational speed of the sun gear), an engine rotational speed Ne (the rotational speed of the carrier), and a second MG rotational speed Nm2 (the rotational speed of the ring gear) are connected by a straight line on the nomographic chart of the power split device 71. That is, when any two of the first MG rotational speed Nm1, the engine rotational speed Ne, and the second MG rotational speed Nm2 are determined, the remaining rotational speed is also determined.

Referring back to FIG. 1, the high voltage DC-to-DC converter 81 is a unidirectional DC-to-DC converter electrically connected between the SMR 30 and the load 82. The high voltage DC-to-DC converter 81 steps down the voltage of electric power transmitted from the battery 10 via the SMR 30 and supplies the stepped-down voltage to the load 82 and the auxiliary DC-to-DC converter 83, according to the switching operation of transistors (not shown) that is performed based on a control signal from the HVECU 90. The high voltage DC-to-DC converter 81 can be regarded as the "DC-to-DC converter" according to the present disclosure.

The load 82 is electrically connected between the high voltage DC-to-DC converter 81 and the auxiliary DC-to-DC converter 83. The load 82 is various devices that operate with electric power supplied from at least one of the high voltage DC-to-DC converter 81 and the auxiliary DC-to-DC converter 83. More specifically, the load 82 includes auxiliaries and by-wire systems (both not shown). The auxiliaries include, e.g., lights (headlights, fog lights, turn signal lights, cornering lights, etc.), an air conditioning system, an audio system, a car navigation system, an antilock brake system (ABS), an oil pump, meters, a defogger, and actuators that drive windshield wipers and power windows. The by-wire systems include electric power steering, an accelerator, and a brake (such as a brake actuator).

The auxiliary DC-to-DC converter 83 is electrically connected between the load 82 and the auxiliary battery 84. The auxiliary DC-to-DC converter 83 is a bidirectional DC-to-DC converter and is, e.g., a choke converter or a flyback converter. The auxiliary DC-to-DC converter 83 is configured so that it can bidirectionally convert DC power between the load 82 and the auxiliary battery 84 according to the switching operation of transistors (not shown) that is performed based on a control signal from the HVECU 90. More specifically, when the SMR 30 is closed, the auxiliary DC-to-DC converter 83 can step down the electric power supplied from the battery 10 via the high voltage DC-to-DC converter 81 to charge the auxiliary battery 84. When the SMR 30 is open, the auxiliary DC-to-DC converter 83 can discharge the auxiliary battery 84 to supply a power supply voltage to the load 82 and the HVECU 90.

The auxiliary battery 84 is configured so that it can be charged and discharged by the auxiliary DC-to-DC converter 83. The output voltage of the auxiliary battery 84 is lower than the output voltage (e.g., about 200V) of the battery 10 and is, e.g., about 12V. The auxiliary battery 84 is, e.g., a lead-acid battery, but the type of the auxiliary battery 84 is not particularly limited. A capacitor such as an electric double layer capacitor may be used instead of the auxiliary battery 84.

Like the battery ECU 40, the HVECU 90 includes a processor 91 such as a CPU, a memory 92 such as a ROM and a RAM, and input and output ports (not shown). The HVECU 90 performs drive control of the vehicle 100 based on data received from the battery ECU 40 and programs and maps stored in the memory 92. In the present embodiment, the HVECU 90 switches between control modes of the vehicle 100. The control modes of the vehicle 100 include a "normal mode" and a "batteryless drive mode." These control modes will also be described later.

The battery ECU 40 can be regarded as the "first controller" according to the present disclosure. The HVECU 90 can be regarded as the "second controller" according to the present disclosure. The HVECU 90 may be comprised of a plurality of ECUs (an engine ECU, an MGECU, etc.) according to the functions, as described in JP 2019-156007 A etc.

Normal Mode

First, the normal mode, which is a mode used while the vehicle 100 is traveling normally, will be described.

Figure 3:
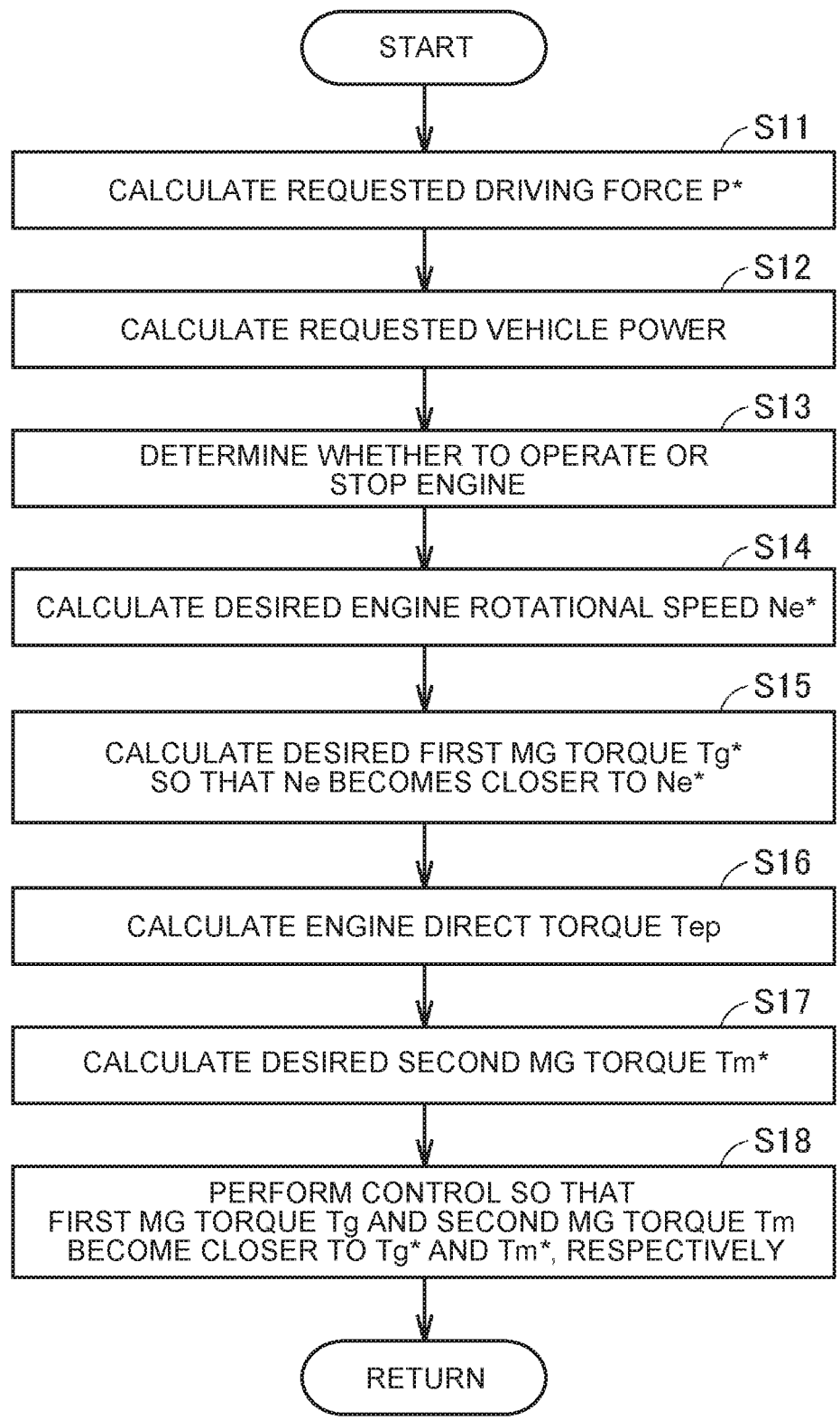
FIG. 3 is a flowchart illustrating an example of a process in a normal mode.

FIG. 3 is a flowchart illustrating an example of a process that is executed in the normal mode. Processes represented by the flowcharts of FIG. 3 and the figures described later (FIGS. 4, 8, 9, etc.) are called from a main routine and repeatedly executed in predetermined cycles when a predetermined condition is satisfied. Each step in these flowcharts is basically implemented by software processing by the HVECU 90, but may be implemented by hardware processing by an electronic circuit provided in the HVECU 90. In the following description of the flowchart, "S" stands for "step."

Referring to FIG. 3, in S11, the HVECU 90 calculates a driving force requested to the vehicle 100 by the user (hereinafter also referred to as the "requested driving force P*"). Specifically, the memory 92 of the HVECU 90 has stored therein driving force maps (not shown) prepared in advance for each shift range. The driving force map defines the relationship among the requested driving force P*, the accelerator operation amount (the operation amount of an accelerator pedal) A, and the vehicle speed V (the second MG rotational speed Nm2). The HVECU 90 can calculate the requested driving force P* from the selected shift range, the accelerator operation amount A, and the vehicle speed V by using the driving force maps.

In S12, the HVECU 90 calculates requested vehicle power that is required to achieve the requested driving force P*. Specifically, the HVECU 90 can calculate the requested vehicle power by multiplying the requested driving force P* by the vehicle speed V and adding predetermined loss power to the resultant product.

In S13, the HVECU 90 determines whether to operate or stop the engine 63 based on the requested vehicle power. For example, when the requested vehicle power is larger than a predetermined threshold, the HVECU 90 determines to operate the engine 63. The HVECU 90 performs S14 and the subsequent steps when it determines to operate the engine 63.

In S14, the HVECU 90 calculates a desired engine rotational speed Ne* from requested engine power. More specifically, since the power required by the vehicle 100 is basically output from the engine 63, it can be said that the requested engine power is equal to the requested vehicle power. The memory 92 of the HVECU 90 has stored therein a recommended operation line indicating how the engine torque Te changes with the engine rotational speed Ne. The recommended operation line is, e.g., an optimal fuel economy line indicating how the engine torque Te change so as to achieve high fuel efficiency. The HVECU 90 can calculate the desired engine rotational speed Ne* by setting the point of intersection of an iso-power line that represents output equal to the requested engine power and the recommended operation line as an operation point of the engine 63.

In S15, the HVECU 90 calculates desired torque Tg* of the first motor generator 61 (hereinafter referred to as the "desired first MG torque Tg*") for bringing the engine rotational speed Ne closer to the desired engine rotational speed Ne*. The HVECU 90 can calculate the desired first MG torque Tg* by feedback control based on the difference between the current engine rotational speed Ne and the desired engine rotational speed Ne*.

In S16, the HVECU 90 calculates engine direct torque Tep. The engine direct torque Tep is torque in the positive direction that is transmitted from the engine 63 to the ring gear of the power split device 71 (that is, to the drive shaft 72) with first MG torque Tg as a reaction force (see FIG. 7 described later). The relationship between the engine direct torque Tep and the desired first MG torque Tg* is uniquely determined according to the gear ratio ρ of the power split device 71 (see the following equation (1)). The engine direct torque Tep can therefore be calculated from the desired first MG torque Tg*.

$$Tep = -1/\rho \times Tg* \quad (1)$$

In S17, the HVECU 90 calculates desired torque Tm* of the second motor generator 62 (hereinafter referred to as the "desired second MG torque Tm*"). The desired second MG torque Tm* is determined so as to achieve the requested driving force P* calculated in S11. Specifically, the HVECU 90 can calculate the desired second MG torque Tm* by subtracting the engine direct torque Tep from the requested driving force P* (see the following equation (2)).

$$Tm* = P* - Tep \quad (2)$$

In S18, the HVECU 90 controls the PCU 50 so that the torque of the first motor generator 61 (first MG torque Tg) and the torque of the second motor generator 62 (second MG torque Tm) become closer to the desired first MG torque Tg* and the desired second MG torque Tm*, respectively.

Batteryless Drive Mode

Next, the batteryless drive mode will be described. The batteryless drive mode is a mode in which the SMR 30 is opened and the vehicle 100 moves with the battery 10 disconnected from the electrical system (the PCU 50, the first motor generator 61, and the second motor generator 62).

More specifically, "engine feedback (F/B) control" and "power balance control" are performed in the batteryless drive mode. The engine feedback control is a process of feedback-controlling the engine torque Te to control the engine rotational speed Ne to the desired engine rotational speed Ne*. The power balance control is a process of controlling the PCU 50 so that the driving force requested by the user (requested driving force) is transmitted to the drive wheels 73 and the electric power that is generated by the first motor generator 61 (hereinafter also referred to as the "first MG generation power") becomes equal to the power that is consumed by the second motor generator 62 (hereinafter also referred to as the "second MG discharge power").

Figure 4:
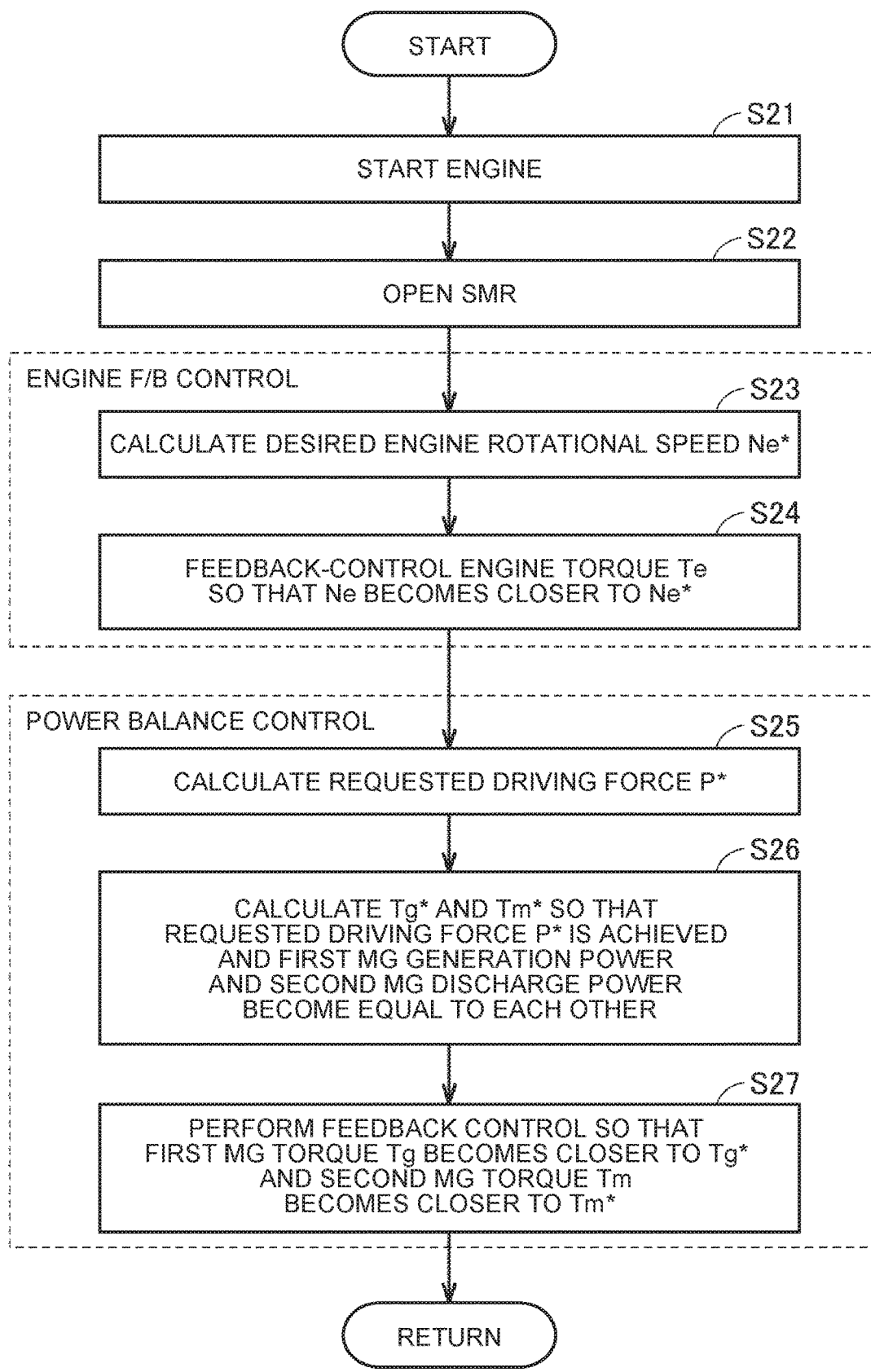
FIG. 4 is a flowchart illustrating an example of a process in a batteryless drive mode.

FIG. 4 is a flowchart illustrating an example of a process that is executed in the batteryless drive mode. Referring to FIG. 4, in S21, the HVECU 90 starts the engine 63 (or keeps the engine 63 in operation if already started). In S22, the HVECU 90 opens the SMR 30 to electrically disconnect the battery 10 from the electrical system.

The HVECU 90 performs the engine feedback control in S23 and S24 and performs the power balance control in S25 to S27. The power balance control and the engine feedback control are performed independently. Although FIG. 4 illustrates an example in which the power balance control is performed after the engine feedback control, the engine feedback control and the power balance control may be performed in a reverse order.

In S23, the HVECU 90 sets the desired engine rotational speed Ne*. For example, the HVECU 90 sets the upper limit of the desired engine rotational speed Ne* to a lower value as the vehicle speed V is lower. The HVECU 90 sets the desired engine rotational speed Ne* to a higher value within the set upper limit as the accelerator operation amount A is larger.

In S24, the HVECU 90 feedback-controls the engine torque Te (specifically, the throttle valve opening degree, the ignition timing, the amount of fuel injection, etc.) so that the engine rotational speed Ne becomes closer to the desired engine rotational speed Ne*.

In S25, the HVECU 90 calculates the requested driving force P* based on the accelerator operation amount A and the vehicle speed V.

In S26, the HVECU 90 calculates the desired first MG torque Tg* and the desired second MG torque Tm* so that the power corresponding to the requested driving force P* is transmitted to the drive wheels 73 and the first MG generation power and the second MG discharge power become equal to each other. Specifically, the HVECU 90 can calculate the desired first MG torque Tg* and the desired second MG torque Tm* by solving the following pair of equations (3) and (4) representing the control states of the engine 63, the first motor generator 61, and the second motor generator 62 during the batteryless drive mode.

$$P^* = (-Tg^*/\rho) \times Nm2 + Tm^* \times Nm2 \quad (3)$$

$$Tg^* \times Nm1 + Tm^* \times Nm2 = 0 \quad (4)$$

Figure 5:
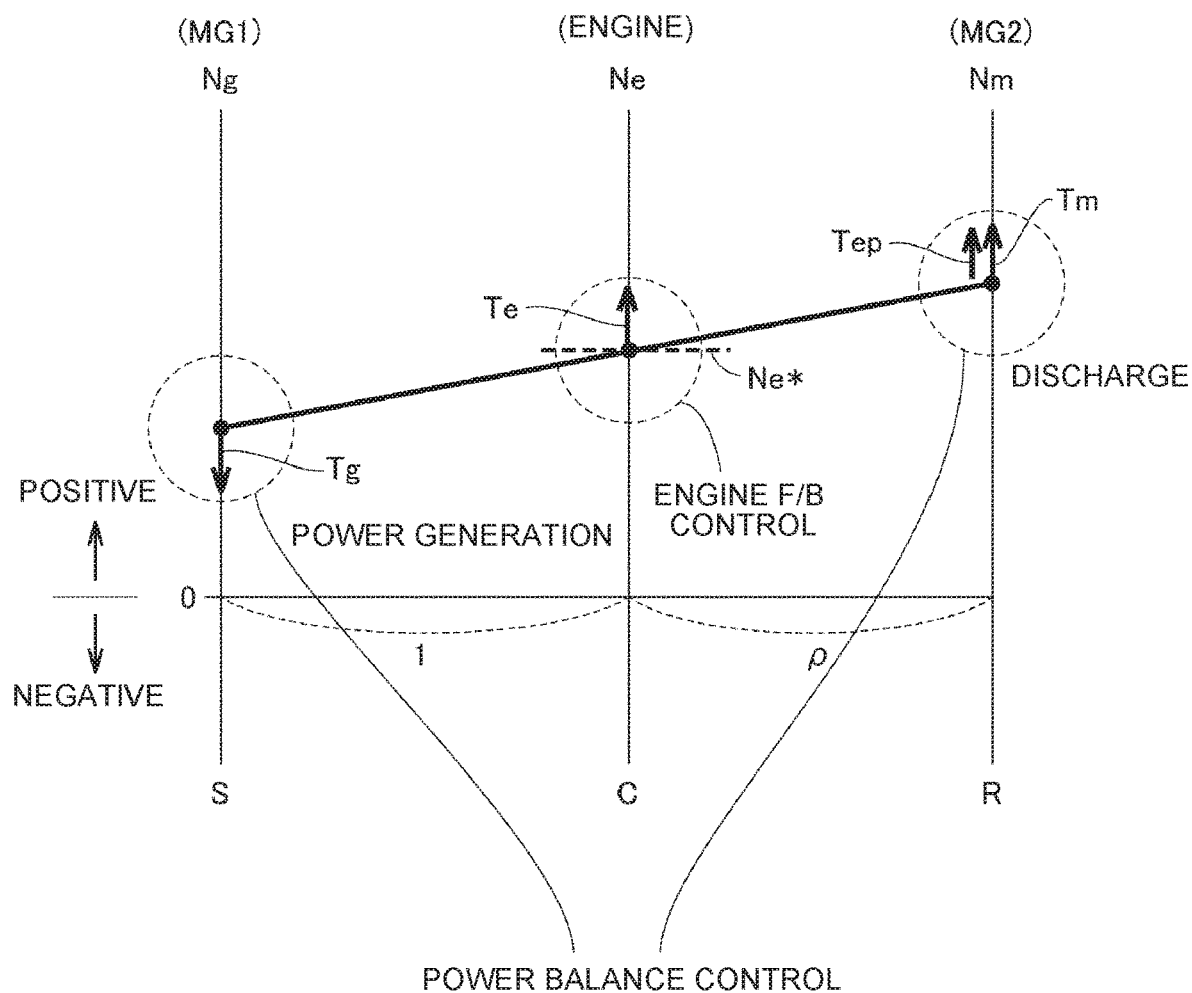
FIG. 5 is a nomographic chart illustrating the control states of a first motor generator, a second motor generator, and an engine in the batteryless drive mode.

FIG. 5 is a nomographic chart illustrating an example of the control states of the first motor generator 61, the second motor generator 62, and the engine 63 in the batteryless drive mode.

Referring to FIGS. 4 and 5, the engine 63 rotates in the forward direction during batteryless drive control (while the vehicle 100 is moving forward). At this time, the first motor generator 61 rotates in the forward direction and generates power generation torque (torque in the negative direction), and the second motor generator 62 rotates in the forward direction and generates discharge torque (torque in the positive direction). Accordingly, in the equations (3) and (4), the desired first MG torque Tg* has a negative value, and the desired second MG torque Tm*, the first MG rotational speed Nm1, and the second MG rotational speed Nm2 have positive values.

In the equation (3), $(-Tg^*/\rho)$ is equal to the engine direct torque Tep (see the equation (2)). Accordingly, the first term on the right side of the equation (3), $\{(-Tg^*/\rho) \times Nm2\}$, represents power that is transmitted from the engine 63 to the drive shaft 72. The second term on the right side of the equation (3), (Tm*×Nm2), represents power that is transmitted from the second motor generator 62 to the drive shaft 72, that is, the second MG discharge power. The equation (3) thus indicates that the requested driving force P* is achieved by the sum of the power that is transmitted from the engine 63 to the drive shaft 72 and the second MG discharge power.

The first term on the left side of the equation (4), (Tg*×Nm1), represents the first MG generation power. As described above, during the batteryless drive control (while the vehicle 100 is moving forward), the first motor generator 61 rotates in the forward direction and generates power generation torque (Nm1>0 and Tg*<0). Accordingly, (Tg*× Nm1) has a negative value. The second term on the left side of the equation (4), (Tm*×Nm2), represents the second MG discharge power. During the batteryless drive control (while the vehicle 100 is moving forward), the second motor generator 62 rotates in the forward direction and generates discharge torque (Nm2>0 and Tm*>0). Accordingly, (Tm*× Nm2) has a positive value. The equation (4) thus indicates that the magnitude (absolute value) of the first MG generation power and the magnitude (absolute value) of the second MG discharge power are equal.

In S27, the HVECU 90 controls the PCU 50 so that the first MG torque Tg and the second MG torque Tm become closer to the desired first MG torque Tm* and the desired second MG torque Tm*, respectively.

Limitation of Charging and Discharging

In the vehicle 100, charging and discharging of the battery 10 is limited in order to protect the battery 10. In the present embodiment, the HVECU 90 limits the allowable charging power Win of the battery 10 and the allowable discharging power Wout of the battery 10 according to the temperature TB of the battery 10 (battery temperature TB).

Figure 6:
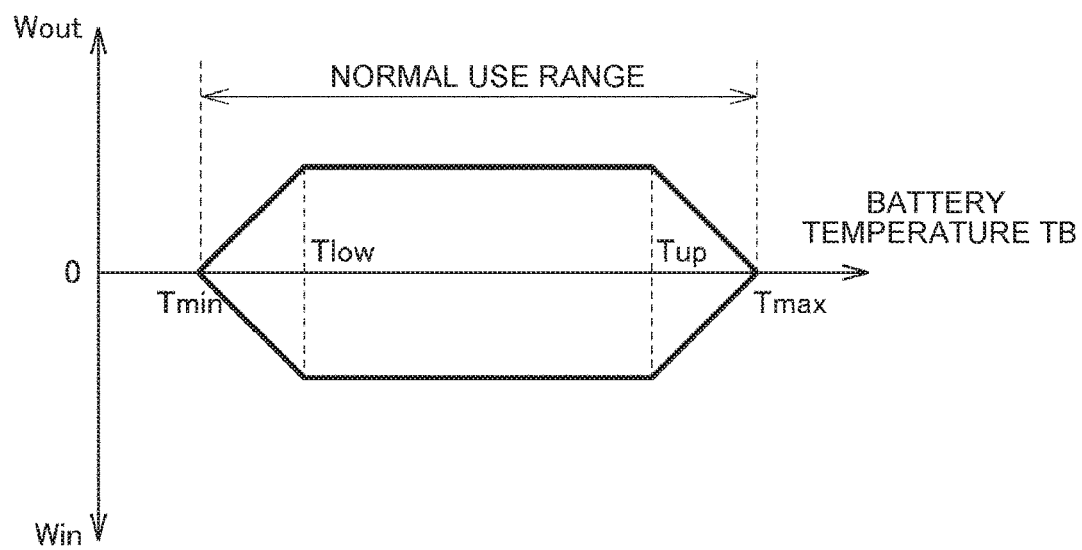
FIG. 6 is a conceptual diagram illustrating limitation of charging and discharging of a battery.

FIG. 6 is a conceptual diagram illustrating limitation of charging and discharging of the battery 10. In FIG. 6, the abscissa represents the battery temperature TB, and the upward direction on the ordinate represents the allowable discharging power Wout, and the downward direction on the ordinate represents the allowable charging power Win.

Referring to FIG. 6, in order to slow degradation of the battery 10, the magnitude of the allowable charging power Win and the magnitude of the allowable discharging power Wout are smaller in a low temperature range (the range of TB<Tlow) and a high temperature range (the range of TB>Tup) than in a normal temperature range (the range of Tlow≤TB≤Tup). The HVECU 90 sets the desired first MG torque Tg* and the desired second MG torque Tm* so that the sum of the charging and discharging power of the first motor generator 61 and the charging and discharging power of the second motor generator 62 is within the range between the allowable charging power Win and the allowable discharging power Wout of the battery 10.

The HVECU 90 prohibits charging and discharging of the battery 10 when the battery temperature TB becomes lower than a minimum temperature Tmin or higher than a maximum temperature Tmax. Hereinafter, the temperature range of the minimum temperature Tmin or higher and the maximum temperature Tmax or lower is also referred to as the "normal use range."

Although FIG. 6 illustrates an example of the temperature dependence of the allowable charging power Win and the allowable discharging power Wout, the allowable charging power Win and the allowable discharging power Wout may be limited according to, e.g., the state of charge (SOC) of the battery 10.

System Compatibility

Regarding the vehicle 100 configured as described above, there may be a situation where a company of the battery pack 1 (Company A) and a company of the HV system 2 (Company B) are different. Compatibility (coordination) between the battery pack 1 and the HV system 2 can be a problem in such a situation.

More specifically, data on the allowable charging power Win and the allowable discharging power Wout of the battery 10 is sent from the battery ECU 40 in the battery pack 1 to the HVECU 90 in the HV system 2. For example, in the case where Company A and Company B have different understandings about the content, timing, etc. of communication or in the case where coordination between Company A and Company B about communication is not enough, there is a possibility that data different from data expected by the HVECU 90 may be sent from the battery ECU 40 to the HVECU 90 as the data on the allowable charging power Win and the allowable discharging power Wout of the battery 10. Specifically, there is a possibility that the battery ECU 40 may set the allowable charging power Win and the allowable discharging power Wout to excessively small values (e.g., values close to 0). In this case, the HVECU 90 may reduce (or prohibit) charging and discharging of the battery 10 even though the temperature of the battery 10 is not actually low or high. As a result, the vehicle 100 may become unable to move.

The present embodiment uses a configuration in which, when the magnitude of the allowable charging power Win or the magnitude of the allowable discharging power Wout sent from the battery ECU 40 becomes excessively small during the normal mode, the control mode is switched from the normal mode to the batteryless drive mode regardless of whether this decrease in magnitude of the allowable charging power Win or magnitude of the allowable discharging power Wout is due to the battery temperature TB having fallen out of the normal use range or due to compatibility between the battery pack 1 and the HV system 2. The batteryless drive mode is a control mode originally intended for limp-home driving (fail-safe driving) of the vehicle 100 in case of an abnormality in the battery 10. In the present embodiment, however, the batteryless drive mode is not used only for this purpose. The control mode is actively switched to the batteryless drive mode regardless of whether limp-home driving is required, thereby ensuring the driving performance of the vehicle 100.

Switching of Control Mode

Figure 7:
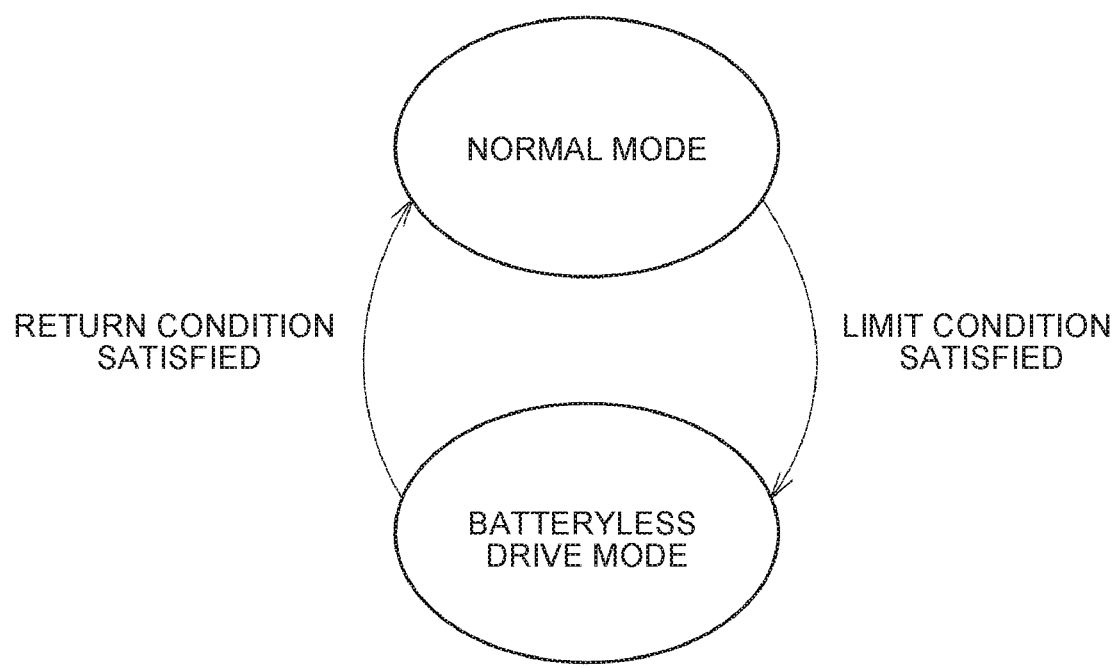
FIG. 7 is a state transition diagram illustrating switching of the control mode of the hybrid vehicle in the first embodiment.

FIG. 7 is a state transition diagram (state machine diagram) illustrating switching of the control mode of the vehicle 100 in the first embodiment. Referring to FIG. 7, the HVECU 90 switches the control mode of the vehicle 100 from the normal mode to the batteryless drive mode when a predetermined "limit condition" is satisfied during the normal mode. The HVECU 90 switches the control mode of the vehicle 100 from the batteryless drive mode back to the normal mode when a predetermined "return condition" is satisfied during the batteryless drive mode. The limit condition and the return condition will be described with reference to flowcharts.

Control Flow

Figure 8:
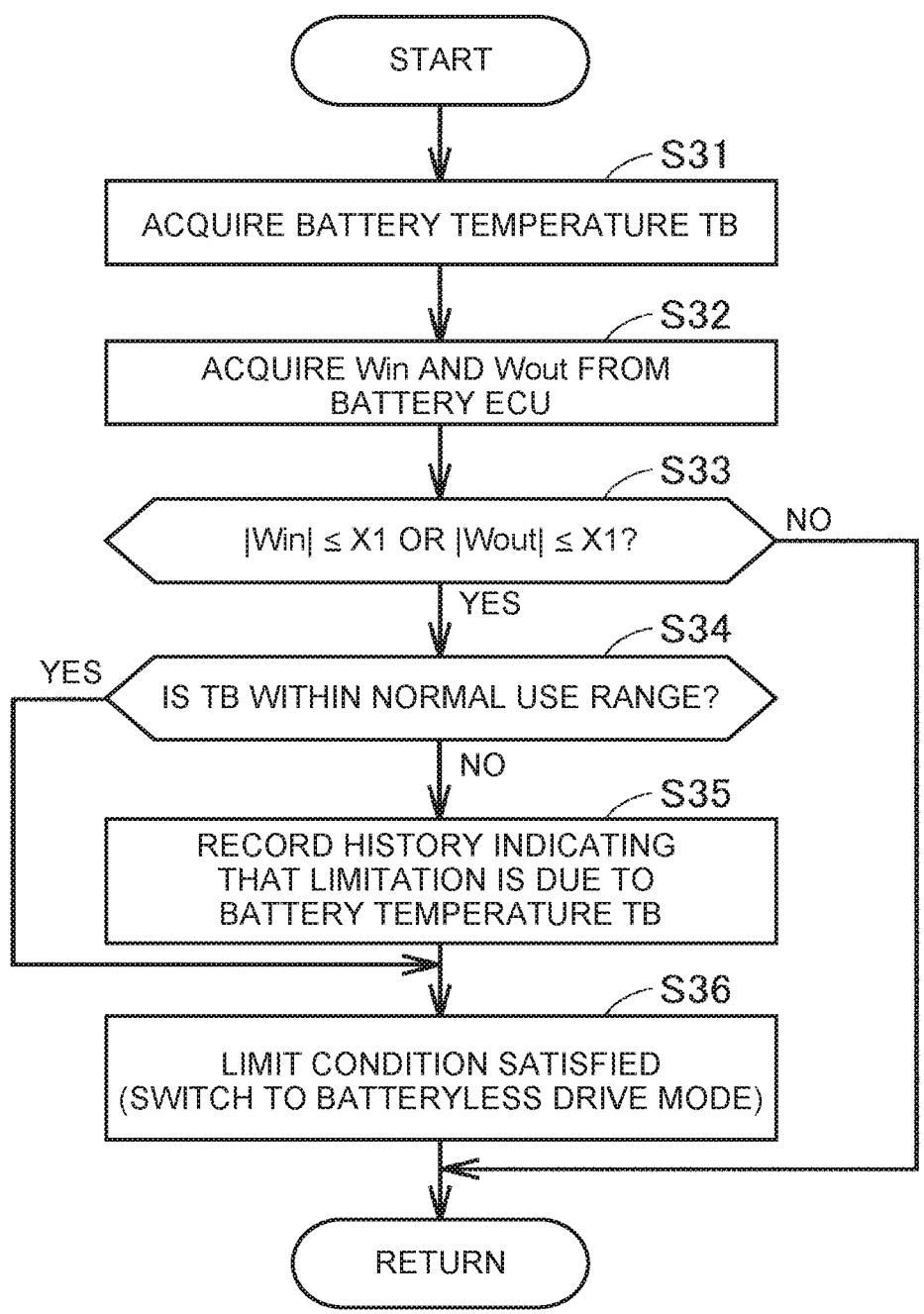
FIG. 8 is a flowchart illustrating an example of a process for switching of the control mode during the normal mode.

FIG. 8 is a flowchart illustrating an example of a process for switching of the control mode (determination of whether the limit condition is satisfied) during the normal mode. Referring to FIG. 8, in S31, the HVECU 90 acquires the battery temperature TB detected by the temperature sensor 23. The HVECU 90 may acquire the battery temperature TB by communication with the battery ECU 40 or may acquire the battery temperature TB directly from the temperature sensor 23. The HVECU 90 also acquires the allowable charging power Win and the allowable discharging power Wout of the battery 10 from the battery ECU 40 (S32).

Subsequently, in S33 and S34, the HVECU 90 determines whether the magnitude of the allowable charging power Win of the battery 10 is equal to or smaller than a first predetermined value X1. The HVECU 90 also determines whether the magnitude of the allowable discharging power Wout of the battery 10 is equal to or smaller than the first predetermined value X1. In order to facilitate understanding of the description, both the magnitude of the allowable charging power Win and the magnitude of the allowable discharging power Wout are compared to the same value (first predetermined value X1) in this example. However, the magnitude of the allowable charging power Win and the magnitude of the allowable discharging power Wout may be compared to different values from each other.

When the magnitude of the allowable charging power Win is larger than the first predetermined value X1 and the magnitude of the allowable discharging power Wout is larger than the first predetermined value X1 (NO in S33), the HVECU 90 does not switch the control mode of the vehicle 100 and the process returns to the main routine. That is, the HVECU 90 maintains the normal mode of the vehicle 100.

On the other hand, when the magnitude of the allowable charging power Win is equal to or smaller than the first predetermined value X1 or the magnitude of the allowable discharging power Wout is equal to or smaller than the first predetermined value X1 (YES in S33), the process proceeds to S34 and the HVECU 90 determines whether the battery temperature TB is within the normal use range. As described above, the normal use range is a temperature range in which the allowable charging power Win does not become equal to 0 and the allowable discharging power Wout does not become equal to 0. In the example of FIG. 6, the normal use range is a temperature range from TB=Tmin to TB=Tmax.

When the battery temperature TB is out of the normal use range (NO in S34), it is highly likely that the magnitude of the allowable charging power Win or the magnitude of the allowable discharging power Wout has become equal to or smaller than the first predetermined value X1 due to the high or low battery temperature TB. The HVECU 90 therefore non-volatilely records on the memory 92 a history indicating that it has become necessary to reduce the charging and discharging power of the battery 10 due to an increase or decrease in battery temperature TB (hereinafter also referred to as the "temperature change history") (S35). For example, the HVECU 90 can set a management flag assigned to the memory 92 to on. The process then proceeds to S36.

When the battery temperature TB is within the normal use range (YES in S34), there is a possibility that it has become necessary to reduce the charging and discharging power of the battery 10 due to compatibility between the battery pack 1 and the HV system 2 rather than due to a change in battery temperature TB. The HVECU 90 therefore does not record the temperature change history, and the process proceeds to S36.

In S36, the HVECU 90 determines that the limit condition is satisfied. The HVECU 90 then switches the control mode of the vehicle 100 from the normal mode to the batteryless drive mode.

Figure 9:
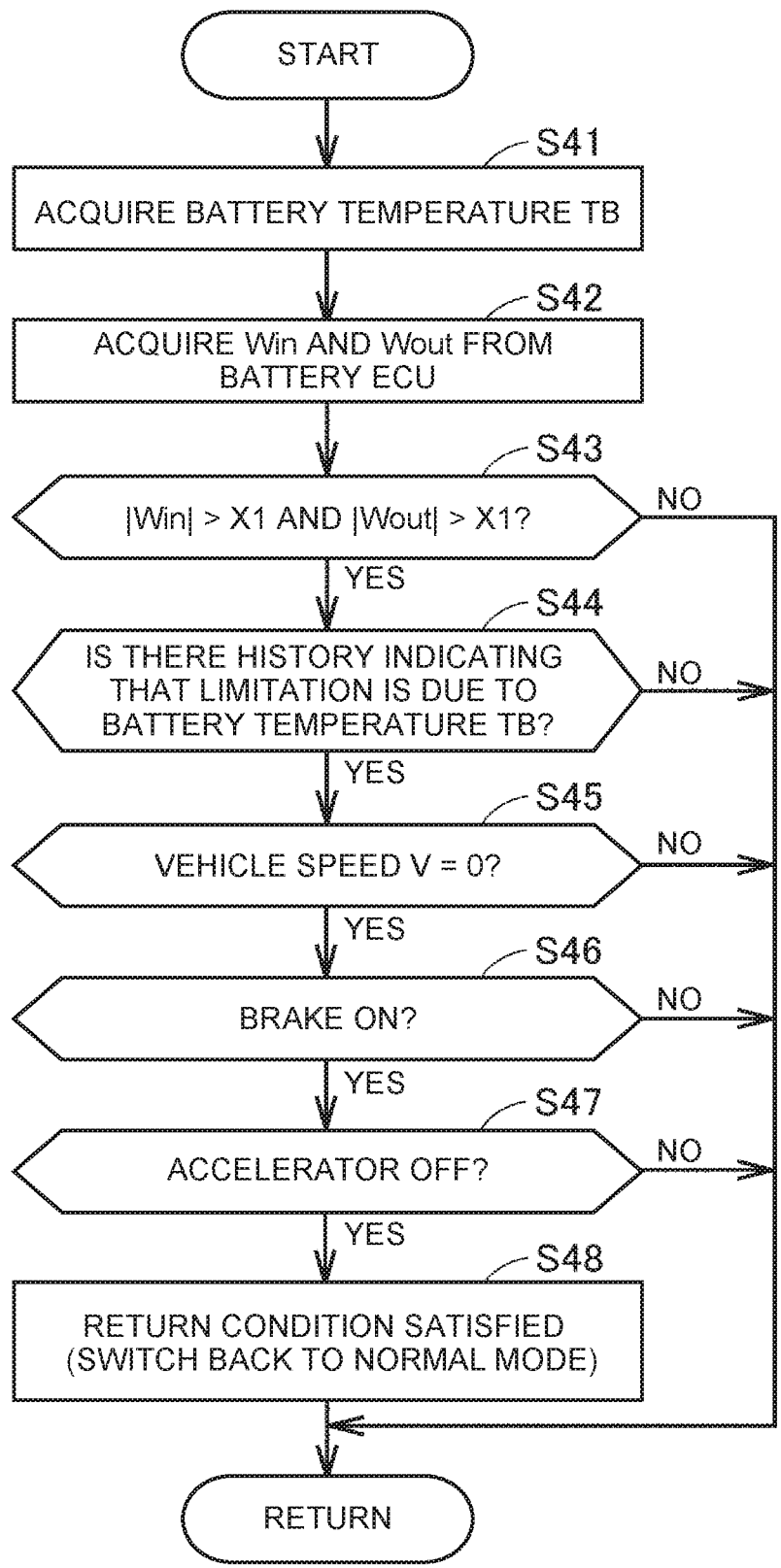
FIG. 9 is a flowchart illustrating an example of a process for switching of the control mode during the batteryless drive mode.

FIG. 9 is a flowchart illustrating an example of a process for switching of the control mode (determination of whether the return condition is satisfied) during the batteryless drive mode. Referring to FIG. 9, the HVECU 90 first acquires the battery temperature TB (S41) and acquires the allowable charging power Win and the allowable discharging power Wout of the battery 10 from the battery ECU 40 (S42).

In S43, the HVECU 90 determines whether the magnitude of the allowable charging power Win of the battery 10 is larger than the first predetermined value X1. The HVECU 90 also determines whether the magnitude of the allowable discharging power Wout of the battery 10 is larger than the first predetermined value X1.

When the magnitude of the allowable charging power Win is equal to or smaller than the first predetermined value X1 or when the magnitude of the allowable discharging power Wout is equal to or smaller than the first predetermined value X1 (NO in S43), it may still necessary to reduce the charging and discharging power of the battery 10. The process thus returns to the main routine, and the HVECU 90 maintains the batteryless drive mode of the vehicle 100.

When the magnitude of the allowable charging power Win is larger than the first predetermined value X1 and the magnitude of the allowable discharging power Wout is larger than the first predetermined value X1 (YES in S43), that is, when it becomes less necessary to reduce the charging and discharging power of the battery 10, the process proceeds to S44, and the HVECU 90 determines whether the memory 92 has the temperature change history (see S35 in FIG. 8) recorded thereon.

When there is no temperature change history (NO in S44), there is a possibility that the charging and discharging power of the battery 10 has been reduced due to compatibility between the battery pack 1 and the HV system 2. In this case, the HVECU 90 does not switch the control mode of the vehicle 100 back to the normal mode but maintains the batteryless drive mode.

When there is the temperature change history (YES in S44), there is a possibility that the charging and discharging power of the battery 10 has been reduced due to a change in battery temperature TB rather than due to compatibility between the battery pack 1 and the HV system 2. Accordingly, in the case where it has become less necessary to reduce the charging and discharging power of the battery 10 due to the battery temperature TB having gone back into the normal use range, the control mode of the vehicle 100 can be switched back to the normal mode.

However, it is desirable to avoid switching the control mode of the vehicle 100 back to the normal mode while the vehicle 100 is moving. Accordingly, in S45 to S47, the HVECU 90 determines whether the vehicle 100 is completely stopped and is ready to return to the normal mode. Specifically, the HVECU 90 determines whether the vehicle speed V=0 (S45), whether the brake of the vehicle 100 is in operation (S46), and whether the accelerator pedal of the vehicle 100 is not being operated (accelerator operation amount A=0) (S47).

When at least one of the determination results of S45 to S47 is NO, the HVECU 90 determines that the traveling state of the vehicle 100 is not suitable for returning to the normal mode, and the process returns to the main routine (the return condition is not satisfied). When all of the determination results of S45 to S47 are YES, the HVECU 90 determines the traveling state of the vehicle 100 is suitable for returning to the normal mode and determines that the return condition is satisfied (S48).

As described above, in the first embodiment, the HVECU 90 in the HV system 2 receives the allowable charging power Win and the allowable discharging power Wout of the battery 10 from the battery ECU 40 in the battery pack 1. When the magnitude of the allowable charging power Win becomes equal to or smaller than the first predetermined value X1 or the magnitude of the allowable discharging power Wout becomes equal to or smaller than the first predetermined value X1 during the normal mode of the vehicle 100, the HVECU 90 switches the control mode of the vehicle 100 to the batteryless drive mode regardless of whether this decrease in magnitude of the allowable charging power Win or magnitude of the allowable discharging power Wout is due to the state of the battery 10 or due to communication between the battery ECU 40 and the HVECU 90. The vehicle 100 can thus be made to move even when there is a problem with communication between the battery ECU 40 and the HVECU 90.

The HVECU 90 also determines whether to record a temperature change history when switching the control mode of the vehicle 100 to the batteryless drive mode. When there is the temperature change history, the HVECU 90 can switch the control mode back to the normal mode when the allowable charging power Win and the allowable discharging power Wout are restored (when the magnitude of the allowable charging power Win becomes larger than the first predetermined value X1 and the magnitude of the allowable discharging power Wout becomes larger than the first predetermined value X1), as the HVECU 90 determines that there is no problem with communication between the battery ECU 40 and the HVECU 90 (there is no problem with compatibility between the battery pack 1 and the HV system 2). The driving performance of the vehicle 100 can thus be quickly restored.

When there is no temperature change history, the HVECU 90 maintains the batteryless drive mode even if the allowable charging power Win and the allowable discharging power Wout are restored, as there is a possibility that there is a problem with communication between the battery ECU 40 and the HVECU 90. A certain level of driving performance of the vehicle 100 can thus be ensured while protecting the battery 10.

Second Embodiment

As described in the first embodiment, the HVECU 90 reduces charging and discharging of the battery 10 when the magnitude of the allowable charging power Win of the battery 10 decreases and the magnitude of the allowable discharging power Wout also decreases. In the second embodiment, a configuration will be described in which the auxiliary battery 84 is used for operation of the load 82 when charging and discharging of the battery 10 is reduced.

Since the overall configurations of hybrid vehicles according to the second embodiment and a third embodiment described later are similar to the overall configuration of the vehicle 100 according to the first embodiment (see FIG. 1), description thereof will not be repeated.

State Transition Diagram

Figure 10:
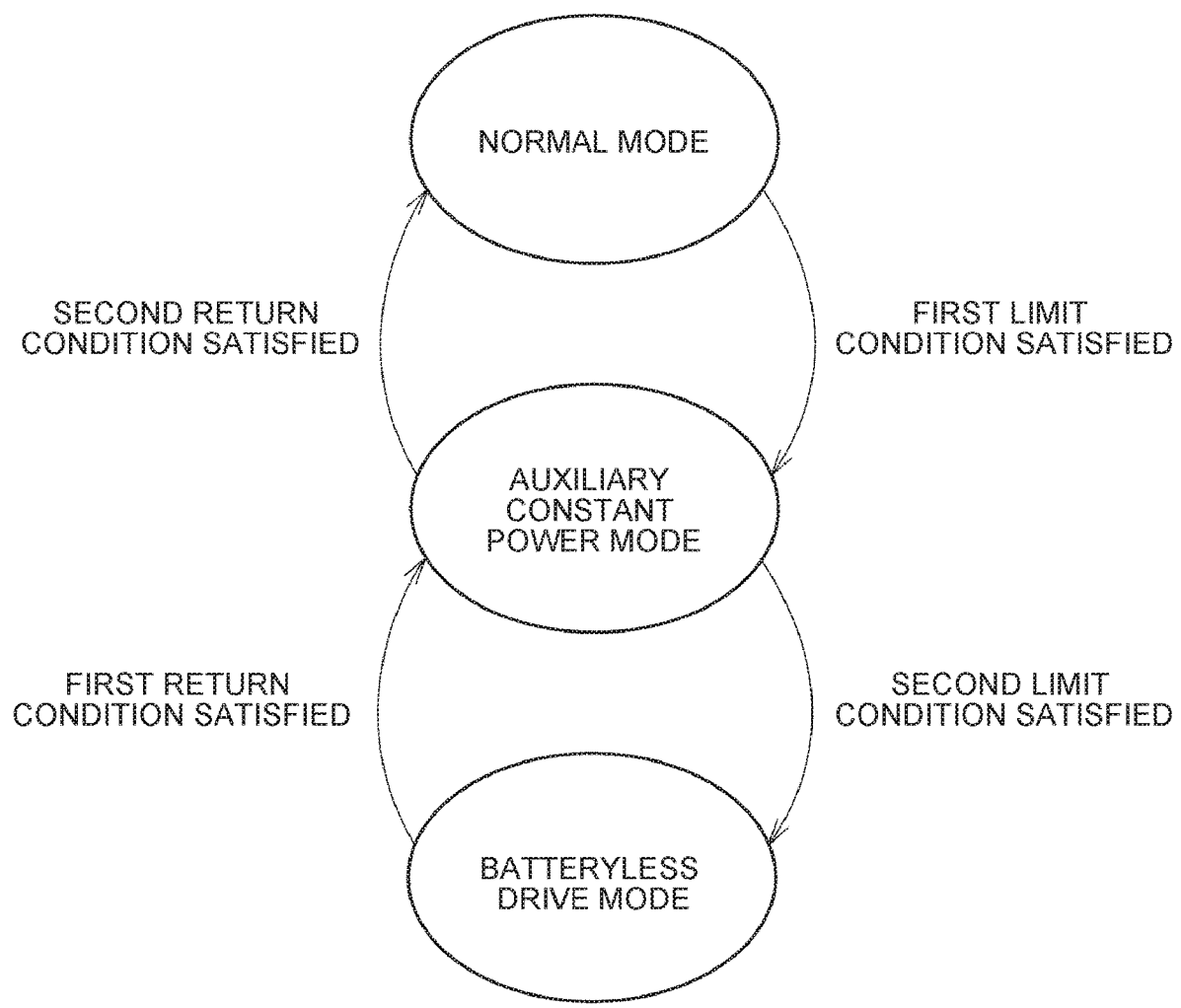
FIG. 10 is a state transition diagram illustrating switching of the control mode of a hybrid vehicle in a second embodiment.

FIG. 10 is a state transition diagram illustrating switching of the control mode of the vehicle 100 in the second embodiment. Referring to FIG. 10, in the second embodiment, the HVECU 90 has an "auxiliary constant power mode" in addition to the normal mode and the batteryless drive mode.

In the normal mode, the HVECU 90 performs constant voltage control of the high voltage DC-to-DC converter 81. When power consumption of the load 82 fluctuates during the constant voltage control such as when any of the lights is turned on or off or the windshield wipers are turned on or off, the charging and discharging power of the high voltage DC-to-DC converter 81 fluctuates. However, the voltage of the load 82 can be kept constant by the constant voltage control of the high voltage DC-to-DC converter 81.

The charging and discharging power of the battery 10 may fluctuate with the fluctuations in charging and discharging power of the high voltage DC-to-DC converter 81. Accordingly, when charging and discharging of the battery 10 has to be reduced due to decreases in allowable charging power Win and allowable discharging power Wout, the fluctuating charging and discharging power of the high voltage DC-to-DC converter 81 may not be able to be covered by the battery 10 alone.

In the second embodiment, when the allowable charging power Win and the allowable discharging power Wout of the battery 10 decrease (before switching to the batteryless drive mode), the HVECU 90 switches the control mode of the vehicle 100 from the normal mode to the auxiliary constant power mode. Specifically, the HVECU 90 switches the control of the high voltage DC-to-DC converter 81 from the constant voltage control in the normal mode to constant power control. The input and output power of the high voltage DC-to-DC converter 81 is therefore constant even when the power consumption of the load 82 fluctuates. The influence of the fluctuations in power consumption of the load 82 on the battery 10 is thus reduced. In this case, the voltage of the load 82 may fluctuate, but such voltage fluctuations of the load 82 can be absorbed by the auxiliary battery 84.

When a "first limit condition" is satisfied during the normal mode, the HVECU 90 switches the control mode of the vehicle 100 from the normal mode to the auxiliary constant power mode. When a "second limit condition" is satisfied during the auxiliary constant power mode, the HVECU 90 switches the control mode of the vehicle 100 from the auxiliary constant power mode to the batteryless drive mode. When a "first return condition" is satisfied during the batteryless drive mode, the HVECU 90 switches the control mode of the vehicle 100 from the batteryless drive mode back to the auxiliary constant power mode. When a "second return condition" is satisfied during the auxiliary constant power mode, the HVECU 90 switches the control mode of the vehicle 100 from the auxiliary constant power mode back to the normal mode.

Although not shown in the figure, when the "second limit condition" is satisfied during the normal mode, the HVECU 90 may switch the control mode of the vehicle 100 from the normal mode directly to the batteryless drive mode by skipping the auxiliary constant power mode. When the "second return condition" is satisfied during the batteryless drive mode, the HVECU 90 may switch the control mode of the vehicle 100 from the batteryless drive mode directly to the normal mode by skipping the auxiliary constant power mode.

Relationship with Win and Wout

Figure 11:
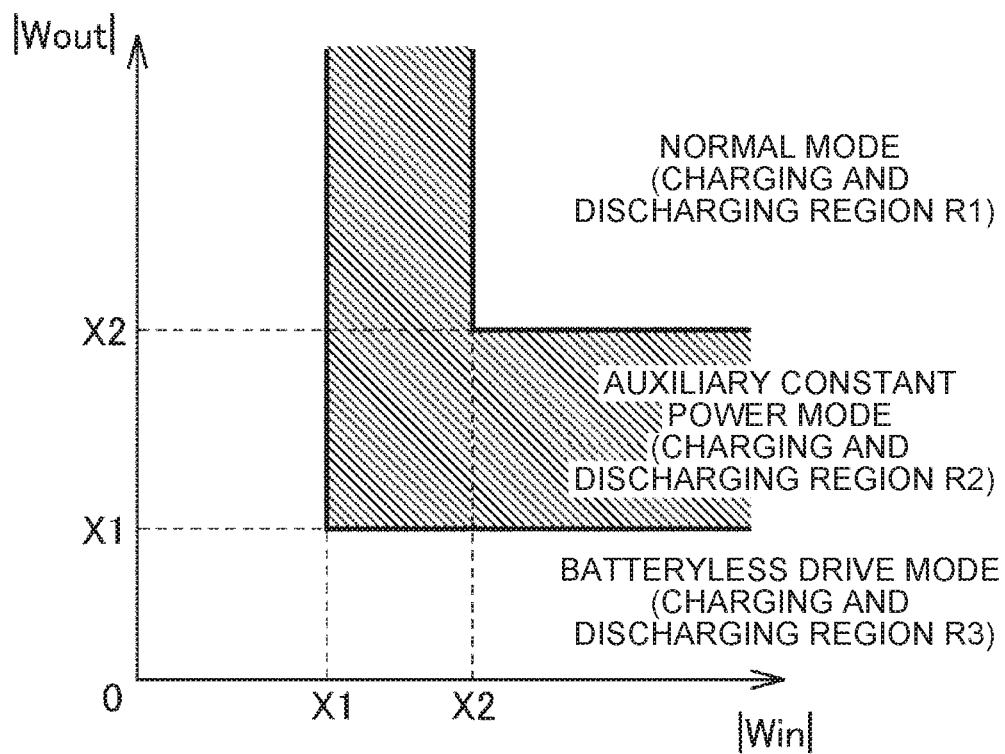
FIG. 11 is a graph illustrating the relationship between the allowable charging power and allowable discharging power of a battery and the control mode in the second embodiment.
Figure 16:
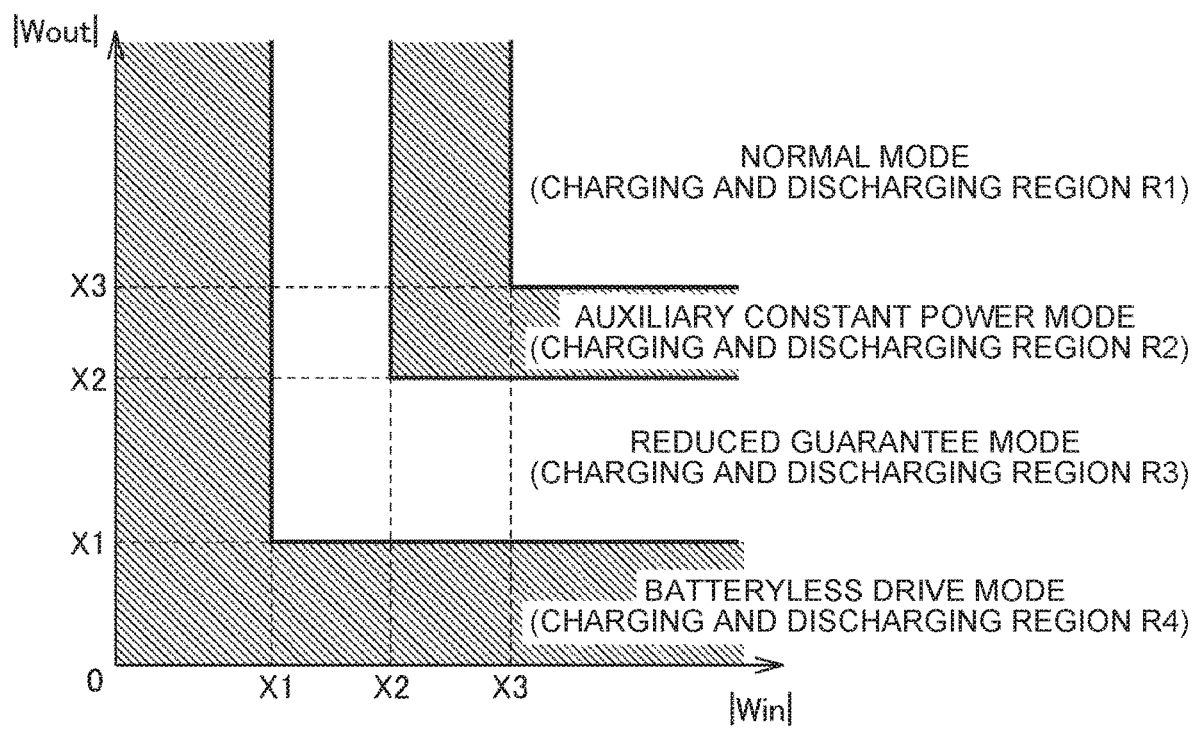
FIG. 16 is a graph illustrating the relationship between the allowable charging power and allowable discharging power of a battery and the control mode in the third embodiment.

FIG. 11 is a graph illustrating the relationship between the allowable charging power Win and the allowable discharging power Wout of the battery 10 and the control mode in the second embodiment. In FIG. 11 and FIG. 16 described later, the abscissa represents the magnitude (absolute value) of the allowable charging power Win of the battery 10, and the ordinate represents the magnitude of the allowable discharging power Wout of the battery 10.

Referring to FIG. 11, the batteryless drive mode can be selected (1) when the magnitude of the allowable charging power Win is equal to or smaller than the first predetermined value X1 or (2) when the magnitude of the allowable discharging power Wout is equal to or smaller than the first predetermined value X1. Hereinafter, this region of the allowable charging power Win and the allowable discharging power Wout is referred to as the "charging and discharging region R3."

The auxiliary constant power mode can be selected (1) when the magnitude of the allowable charging power Win is larger than X1 and the magnitude of the allowable discharging power Wout is larger than X1 and equal to or smaller than X2 or (2) when the magnitude of the allowable charging power Win is larger than X1 and equal to or smaller than X2 and the magnitude of the allowable discharging power Wout is larger than X1. Hereinafter, this region of the allowable charging power Win and the allowable discharging power Wout is referred to as the "charging and discharging region R2."

The normal mode can be selected in cases other than the above, that is, when the magnitude of the allowable charging power Win is larger than X2 and the magnitude of the allowable discharging power Wout is larger than X2. Hereinafter, this region of the allowable charging power Win and the allowable discharging power Wout is referred to as the "charging and discharging region R1."

The second embodiment (and the third embodiment described later) also illustrates an example in which the magnitude of the allowable charging power Win and the magnitude of the allowable discharging power Wout are compared to the same value (the first predetermined value X1 or the second predetermined value X2) for each control mode. However, this is for the purpose of avoiding complication of the description, and the magnitude of the allowable charging power Win and the magnitude of the allowable discharging power Wout may be compared to different values from each other.

Determination of Whether Limit Condition is Satisfied

Figure 12:
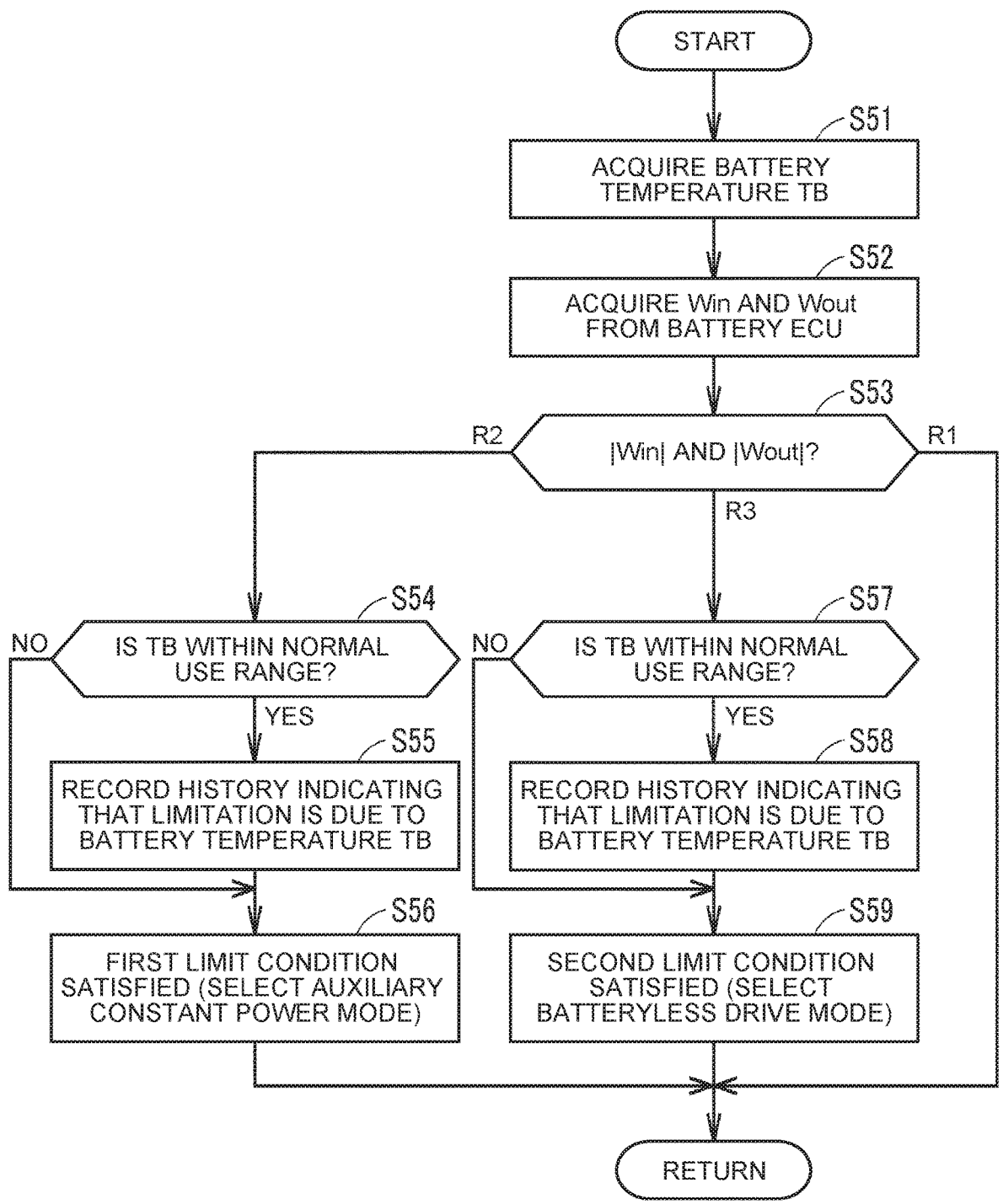
FIG. 12 is a flowchart illustrating an example of a process for determination of whether a limit condition is satisfied according to the second embodiment.

FIG. 12 is a flowchart illustrating an example of a process for determination of whether the limit condition (the first limit condition or the second limit condition) is satisfied according to the second embodiment. Referring to FIGS. 12, S51 and S52 are similar to S31 and S32 (see FIG. 8) in the first embodiment.

In S53, the HVECU 90 compares the magnitude of the allowable charging power Win and the magnitude of the allowable discharging power Wout of the battery 10 to a predetermined value (the first predetermined value X1 or the second predetermined value X2). When the magnitude of the allowable charging power Win and the magnitude of the allowable discharging power Wout are included in the charging and discharging region R2 (R2 in S53), the process proceeds to S54. S54 and S55 are similar to S34 and S35 in the first embodiment. The HVECU 90 then determines that the first limit condition is satisfied and selects the auxiliary constant power mode as the control mode of the vehicle 100 (S56).

When the magnitude of the allowable charging power Win and the magnitude of the allowable discharging power Wout are included in the charging and discharging region R3 in S53 (R3 in S53), the HVECU 90 causes the process to proceed to S57. S57 and S58 are similar to S54 and S55. The HVECU 90 then determines that the second limit condition is satisfied and selects the batteryless drive mode as the control mode of the vehicle 100 (S59).

When the magnitude of the allowable charging power Win and the magnitude of the allowable discharging power Wout are included in the charging and discharging region R1 in S53 (R1 in S53), the HVECU 90 does not perform S54 and the subsequent steps or S57 and the subsequent steps and the process returns to the main routine. In this case, the normal mode is selected as the control mode of the vehicle 100.

Determination of Whether Return Condition is Satisfied

Figure 13:
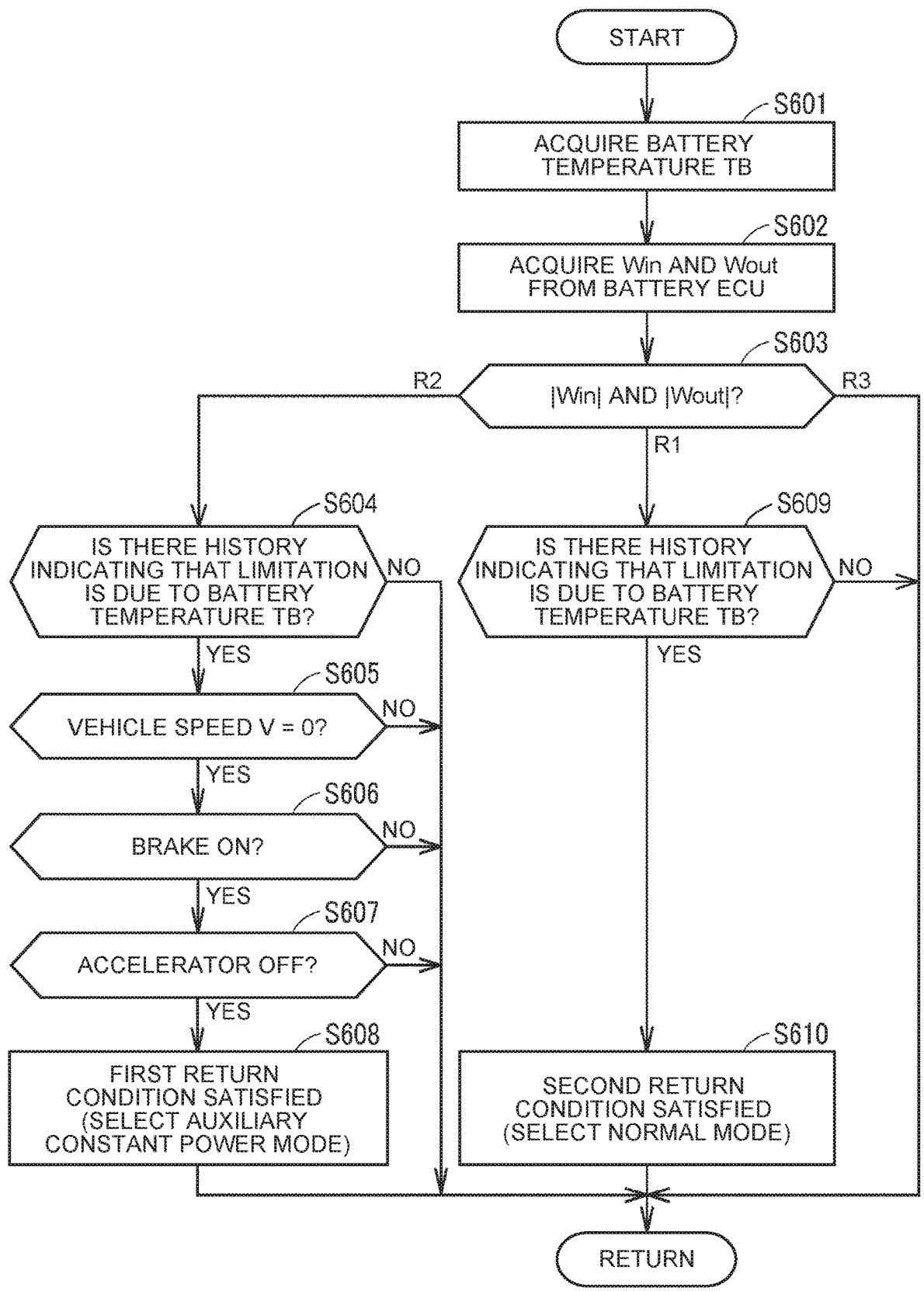
FIG. 13 is a flowchart illustrating an example of a process for determination of whether a return condition is satisfied according to the second embodiment.

FIG. 13 is a flowchart illustrating an example of a process for determination of whether the return condition (the first return condition or the second return condition) is satisfied according to the second embodiment. Referring to FIGS. 13, S601 and S602 are similar to S41 and S42 (see FIG. 9) in the first embodiment.

In S603, the HVECU 90 compares the magnitude of the allowable charging power Win and the magnitude of the allowable discharging power Wout of the battery 10 to a predetermined value (the first predetermined value X1 or the second predetermined value X2). When the magnitude of the allowable charging power Win and the magnitude of the allowable discharging power Wout are included in the charging and discharging region R2 (R2 in S603), the HVECU 90 causes the process to proceed to S604. S604 to S607 are similar to S44 to S47 (see FIG. 9) in the first embodiment. The HVECU 90 then determines that the first return condition is satisfied and selects the auxiliary constant power mode as the control mode of the vehicle 100 (S608).

When the magnitude of the allowable charging power Win and the magnitude of the allowable discharging power Wout are included in the charging and discharging region R1 in S603 (R1 in S603), the HVECU 90 causes the process to proceed to S609. In S609, the HVECU 90 determines whether there is a temperature change history. When there is a temperature change history (YES in S609), the HVECU 90 determines that the second return condition is satisfied and selects the normal mode as the control mode of the vehicle 100 (S610).

When the magnitude of the allowable charging power Win and the magnitude of the allowable discharging power Wout are included in the charging and discharging region R3 in S603 (R3 in S603), the HVECU 90 does not perform S604 and the subsequent steps or S609 and the subsequent steps and the process returns to the main routine. In this case, the batteryless drive mode is maintained as the control mode of the vehicle 100.

As described above, in the second embodiment, the HVECU 90 further has the auxiliary constant power mode in which the HVECU 90 performs the constant power control of the high voltage DC-to-DC converter 81. In the auxiliary constant power mode, a change in charging and discharging power of the battery 10 with fluctuations in electric power of the load 82 is reduced by allowing voltage fluctuations of the auxiliary battery 84 with fluctuations in power consumption of the load 82 to some extent. The battery 10 whose allowable charging power Win and allowable discharging power Wout are relatively severely limited can thus be more reliably protected.

Depending on the SOC of the auxiliary battery 84, fluctuations in electric power of the load 82 may not be completely absorbed by the auxiliary battery 84. When the auxiliary battery 84 is close to its fully charged state, the auxiliary battery 84 can receive only a small amount of electric power. When the auxiliary battery 84 almost runs out, the auxiliary battery 84 can supply only a small amount of electric power. It is therefore desirable to set an upper limit on the rate of change in charging and discharging power of the high voltage DC-to-DC converter 81 according to the SOC of the auxiliary battery 84 so that the charging and discharging power of the high voltage DC-to-DC converter 81 does not change suddenly. Specifically, when the auxiliary battery 84 is close to its fully charged state or when the auxiliary battery 84 almost runs out, the rate of change in charging and discharging power of the high voltage DC-to-DC converter 81 can be made as low as a predetermined value or less.

The second embodiment is described with respect to an example in which the vehicle 100 has three control modes: the normal mode, the auxiliary constant power mode, and the batteryless drive mode. However, the batteryless drive mode is not an essential control mode. The vehicle 100 may have two control modes: the normal mode and the auxiliary constant power mode, and may be configured to switch the control mode between the normal mode and the auxiliary constant power mode.

Third Embodiment

Even when the engine torque Te (or engine power Pe) to be output is determined, a slight error in engine power Pe may occur in actual engine control due to excessive fuel supply etc. In the third embodiment, control for handling on the error in engine power Pe will be described.

State Transition Diagram

Figure 14:
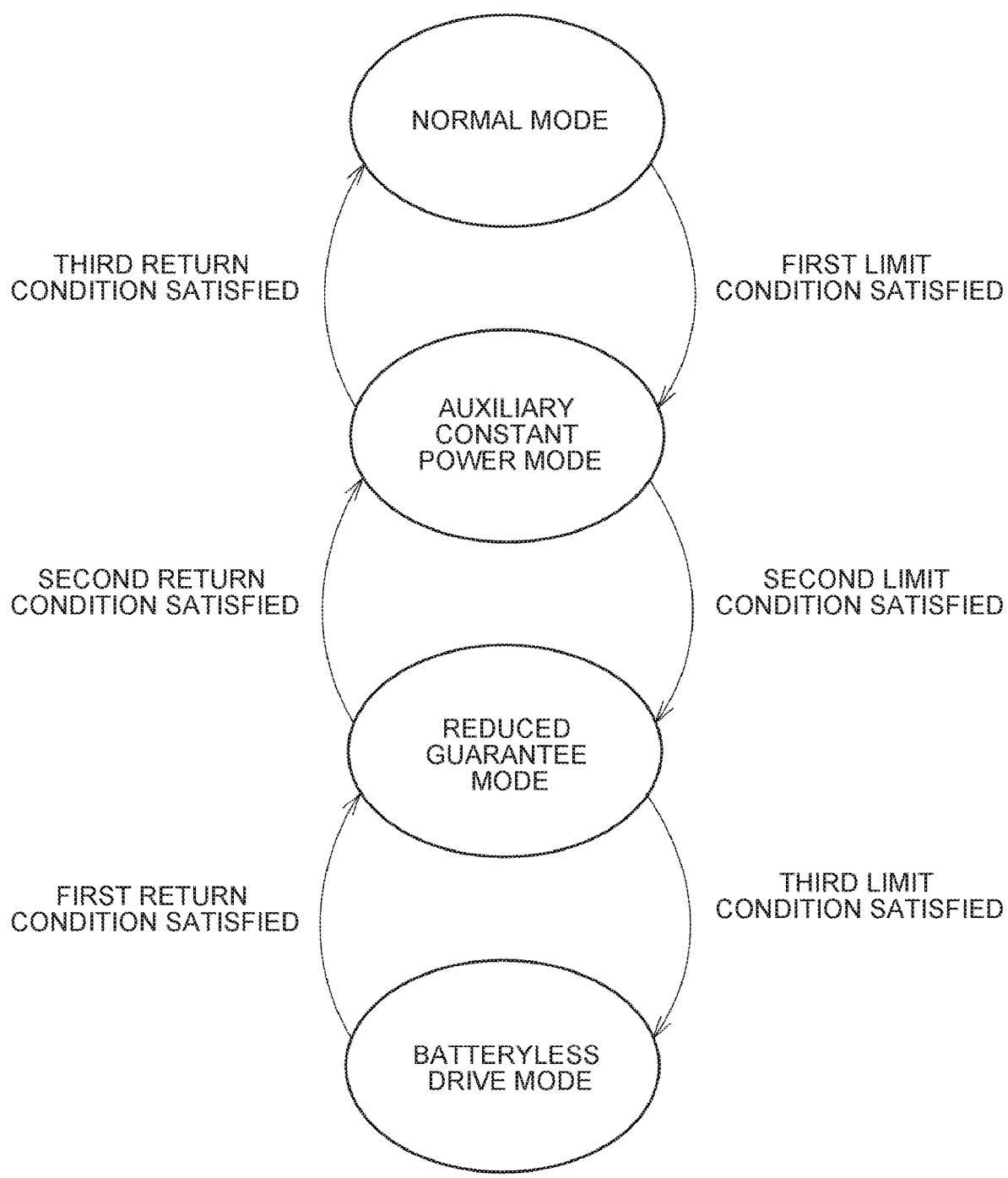
FIG. 14 is a state transition diagram illustrating switching of the control mode of a hybrid vehicle in a third embodiment.

FIG. 14 is a state transition diagram illustrating switching of the control mode of the vehicle 100 in the third embodiment. Referring to FIG. 14, in the third embodiment, the HVECU 90 has a "reduced guarantee mode" in addition to the normal mode, the auxiliary constant power mode, and the batteryless drive mode.

As described above, in the normal mode, each torque (the engine torque Te, the first MG torque Tg, and the second MG torque Tm) is adjusted so as to achieve the requested driving force P* according to the operation of the accelerator pedal by the user. When the engine power Pe changes, the first MG power and the second MG power are controlled so as to compensate for the change. Accordingly, for example, when a desired value of the engine power Pe is 4.0 kW and an actual value of the engine power Pe is 4.5 kW, the battery 10 is charged with the power corresponding to the difference therebetween, which is 4.5 kW−4.0 kW=500 W. When the desired value of the engine power Pe is 4.0 kW and the actual value of the engine power Pe is 3.5 kW, the power of 500 W is discharged from the battery 10.

As described above, in the normal mode, the error in engine power Pe is absorbed by charging or discharging of the battery 10. This control is based on the design idea of guaranteeing the requested driving force P*, namely giving priority to accurately reflecting the operation of the accelerator pedal by the user in the driving force that is generated by the vehicle 100.

In the batteryless drive mode, the SMR 30 is opened and the battery 10 is electrically disconnected from the PCU 50. Accordingly, it may be more difficult than in the normal mode to adjust the first MG power and the second MG power so as to achieve the requested driving force P*. That is, it may be difficult to guarantee the requested driving force P*.

In the third embodiment, as the magnitude of the allowable charging power Win and the magnitude of the allowable discharging power Wout of the battery 10 decrease, the control mode is switched to the reduced guarantee mode before being switched to the batteryless drive mode. In the reduced guarantee mode, the HVECU 90 stops feedback control of the first MG power and the second MG power for achieving the requested driving force P*, while keeping the SMR 30 closed. In this case, when an error in engine power Pe occurs, the driving force of the vehicle 100 may increase or decrease with the error not sufficiently absorbed by charging or discharging of the battery 10. As a result, a change in acceleration or deceleration of the vehicle 100 may be larger than in the normal mode.

As described above, the reduced guarantee mode is a control mode based on the idea of less strictly guaranteeing the requested driving force P* in a situation where the magnitude of the allowable charging power Win and the magnitude of the allowable discharging power Wout have decreased, but not so much as to switch the control mode to the batteryless drive mode. A slight deviation between the driving force according to the operation of the accelerator pedal by the user (the requested driving force P*) and the actual driving force is allowed in the reduced guarantee mode.

In the reduced guarantee mode, the SMR 30 is closed and the battery 10 can be charged and discharged. Accordingly, the driving performance of the vehicle 100 is better in the reduced guarantee mode than in the batteryless drive mode. From another point of view, in conventional vehicles that are not equipped with a traction battery (conventional vehicles such as gasoline vehicles), an error in engine power may directly affect the vehicle driving force. It can also be said that the reduced guarantee mode is a control mode in which the level of guarantee of the requested driving force P* is the same as that in the conventional vehicles.

When a "first limit condition" is satisfied during the normal mode, the HVECU 90 switches the control mode of the vehicle 100 from the normal mode to the auxiliary constant power mode. When a "second limit condition" is satisfied during the auxiliary constant power mode, the HVECU 90 switches the control mode of the vehicle 100 from the auxiliary constant power mode to the reduced guarantee mode. When a "third limit condition" is satisfied during the reduced guarantee mode, the HVECU 90 switches the control mode of the vehicle 100 from the reduced guarantee mode to the batteryless drive mode.

When a "first return condition" is satisfied during the batteryless drive mode, the HVECU 90 switches the control mode of the vehicle 100 from the batteryless drive mode back to the reduced guarantee mode. When a "second return condition" is satisfied during the reduced guarantee mode, the HVECU 90 switches the control mode of the vehicle 100 from the reduced guarantee mode back to the auxiliary constant power mode. When a "third return condition" is satisfied during the auxiliary constant power mode, the HVECU 90 switches the control mode of the vehicle 100 from the auxiliary constant power mode back to the normal mode.

In the third embodiment as well, the HVECU 90 may skip the mode between one mode and another mode. For example, the HVECU 90 may switch the control mode of the vehicle 100 from the normal mode to the reduced guarantee mode by skipping the auxiliary constant power mode. The HVECU 90 may switch the control mode of the vehicle 100 from the normal mode to the batteryless drive mode by skipping the auxiliary constant power mode and the reduced guarantee mode. The HVECU 90 may switch the control mode of the vehicle 100 from the auxiliary constant power mode to the batteryless drive mode by skipping the reduced guarantee mode. Although detailed description will not be repeated, the same applies to when switching the control mode of the vehicle 100 from the batteryless drive mode back to the normal mode.

Reduced Guarantee Mode

Figure 15:
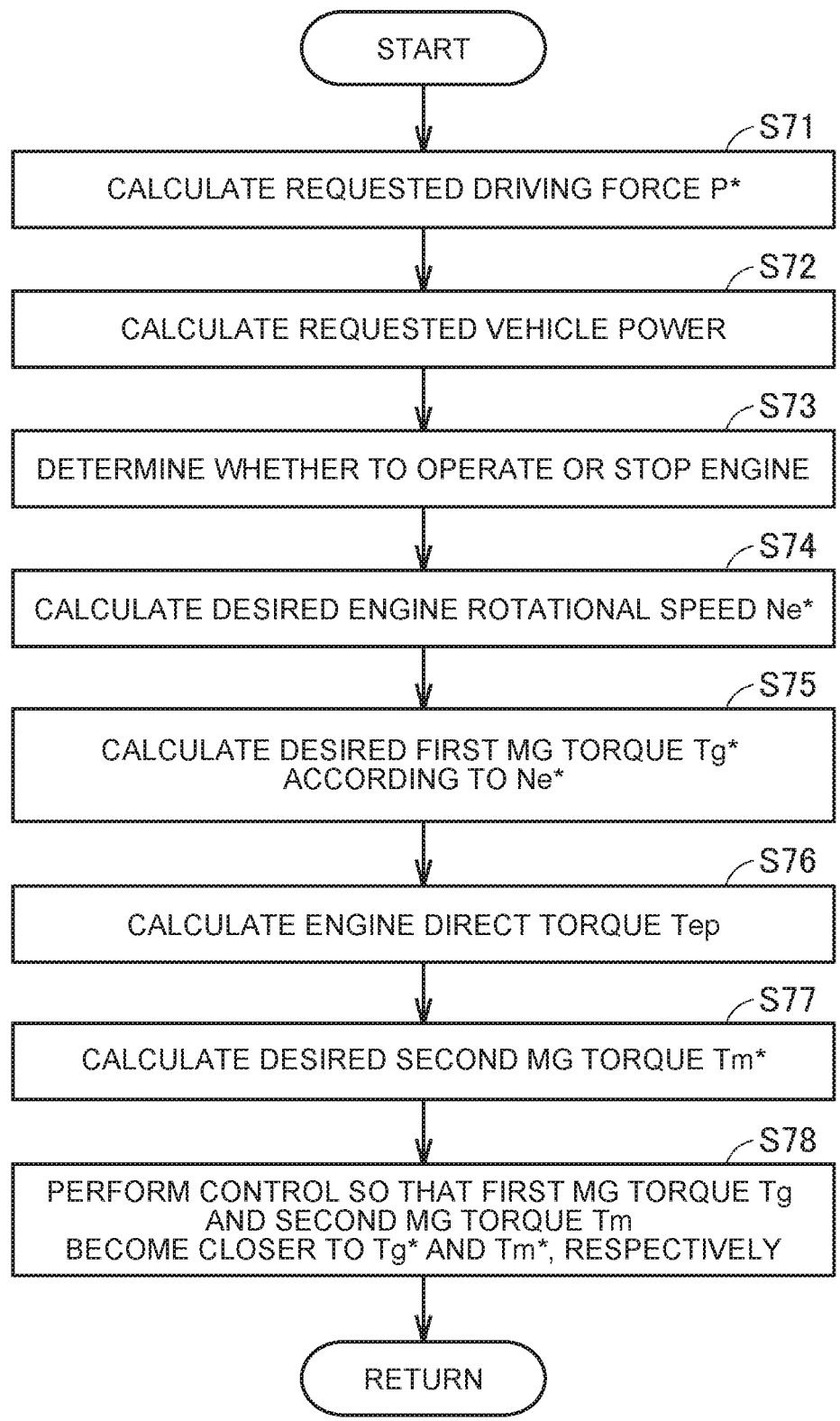
FIG. 15 is a flowchart illustrating an example of a process in a reduced guarantee mode.

FIG. 15 is a flowchart illustrating an example of a process in the reduced guarantee mode. Referring to FIG. 15, since S71 to S74 are similar to S11 to S14 in the normal mode (see FIG. 3), description thereof will not be repeated.

In S75, the HVECU 90 calculates the desired first MG torque Tg* according to the desired engine rotational speed Ne* calculated in S74. That is, the HVECU 90 does not use feedback based on the difference between the current engine rotational speed Ne and the desired engine rotational speed Ne* to calculate the desired first MG torque Tg*.

In S76, the HVECU 90 calculates the engine direct torque Tep from the desired first MG torque Tg*. The HVECU 90 also calculates the desired second MG torque Tm* by subtracting the engine direct torque Tep from the requested driving force P* (S77). The HVECU 90 then controls the PCU 50 so that the first MG torque Tg and the second MG torque Tm become closer to the desired first MG torque Tg* and the desired second MG torque Tm*, respectively (S78). These steps are similar to the corresponding steps in the normal mode (S16 to S18).

As described above, in the reduced guarantee mode, even when a slight error in operation point of the engine 63 (the engine rotational speed Ne or the engine power Pe) occurs due to excessive fuel supply etc., no adjustment of the desired first MG torque Tg* (and the desired second MG torque Tm*) is made to absorb the error. In this case, an error in actual driving force from the requested driving force P* may occur. However, this error in driving force is allowed.

Relationship with Win and Wout

FIG. 16 is a graph illustrating the relationship between the allowable charging power Win and the allowable discharging power Wout of the battery 10 and the control mode in the third embodiment. Referring to FIG. 16, the batteryless drive mode can be selected when the magnitude of the allowable charging power Win is equal to or smaller than X1 or when the magnitude of the allowable discharging power Wout is equal to or smaller than X1. Hereinafter, this region of the allowable charging power Win and the allowable discharging power Wout is referred to as the "charging and discharging region R4."

The reduced guarantee mode can be selected (1) when the magnitude of the allowable charging power Win is larger than X1 and the magnitude of the allowable discharging power Wout is larger than X1 and equal to or smaller than X2 or (2) when the magnitude of the allowable charging power Win is larger than X1 and equal to or smaller than X2 and the magnitude of the allowable discharging power Wout is larger than X1. Hereinafter, this region of the allowable charging power Win and the allowable discharging power Wout is referred to as the "charging and discharging region R3."

The auxiliary constant power mode can be selected (1) when the magnitude of the allowable charging power Win is larger than X2 and the magnitude of the allowable discharging power Wout is larger than X2 and equal to or smaller than X3 or (2) when the magnitude of the allowable charging power Win is larger than X2 and equal to or smaller than X3 and the magnitude of the allowable discharging power Wout is larger than X2. Hereinafter, this region of the allowable charging power Win and the allowable discharging power Wout is referred to as the "charging and discharging region R2."

The normal mode can be selected in cases other than the above, that is, when the magnitude of the allowable charging power Win is larger than X3 and the magnitude of the allowable discharging power Wout is larger than X3. Hereinafter, this region of the allowable charging power Win and the allowable discharging power Wout is referred to as the "charging and discharging region R1."

Determination of Whether Limit Condition is Satisfied

Figure 17:
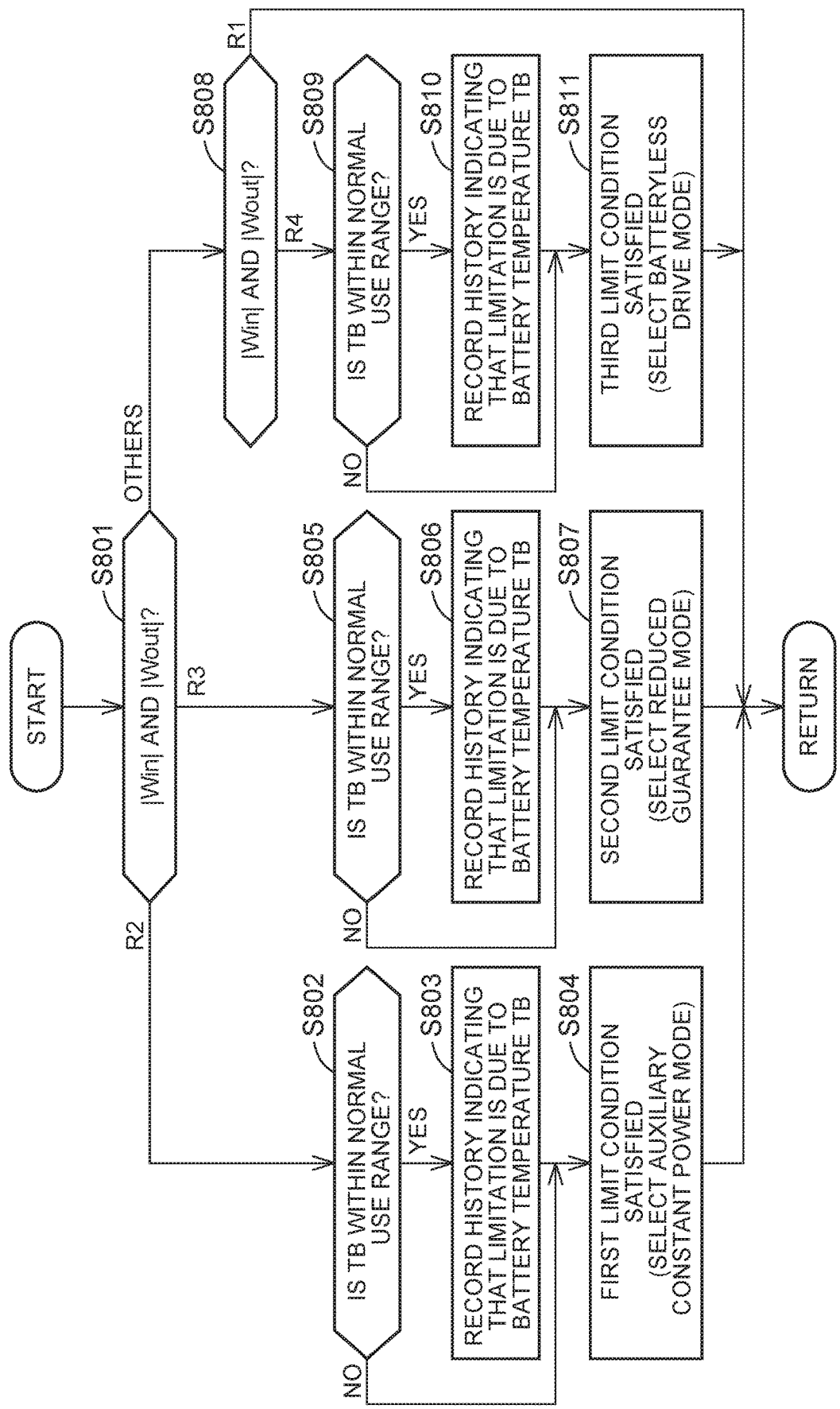
FIG. 17 is a flowchart illustrating an example of a process for determination of whether a limit condition is satisfied according to the third embodiment.

FIG. 17 is a flowchart illustrating an example of a process for determination of whether the limit condition is satisfied according to the third embodiment. In FIG. 17 and FIG. 18 described later, the steps of acquiring the battery temperature TB and acquiring the allowable charging power Win and the allowable discharging power Wout by the HVECU 90 (see S51 and S52 of FIG. 12 or S601 and S602 of FIG. 13) are not shown due to space limitations.

Referring to FIG. 17, in S801 (and S808), the HVECU 90 compares the magnitude of the allowable charging power Win and the magnitude of the allowable discharging power Wout of the battery 10 to predetermined values (the first to third predetermined values X1 to X3).

When the magnitude of the allowable charging power Win and the magnitude of the allowable discharging power Wout are included in the charging and discharging region R2 (R2 in S801), the HVECU 90 determines that the first limit condition is satisfied and selects the auxiliary constant power mode (S804). S802 and S803 before S804 are similar to S54 and S55 (see FIG. 12) in the second embodiment. S805, S806 and S809, S810 are also similar to S54 and S55 in the second embodiment.

When the magnitude of the allowable charging power Win and the magnitude of the allowable discharging power Wout are included in the charging and discharging region R3 (R3 in S801), the HVECU 90 determines that the second limit condition is satisfied and selects the reduced guarantee mode (S807).

When the magnitude of the allowable charging power Win and the magnitude of the allowable discharging power Wout are included in the charging and discharging region R4 ("OTHERS" in S801 and R4 in S808), the HVECU 90 determines that the third limit condition is satisfied and selects the batteryless drive mode (S811).

When the magnitude of the allowable charging power Win and the magnitude of the allowable discharging power Wout are included in the charging and discharging region R1 ("OTHERS" in S801 and R1 in S808), the HVECU 90 causes the process to return to the main routine. In this case, none of the first to third limit conditions are satisfied, and the control mode is not switched to any mode in which charging and discharging of the battery 10 is more reduced.

Determination of Whether Return Condition is Satisfied

FIG. 18 is a flowchart illustrating an example of a process for determination of whether the return condition is satisfied according to the third embodiment. Referring to FIG. 18, in S901 (and S908), the HVECU 90 compares the magnitude of the allowable charging power Win and the magnitude of the allowable discharging power Wout of the battery 10 to predetermined values (the first to third predetermined values X1 to X3).

When the magnitude of the allowable charging power Win and the magnitude of the allowable discharging power Wout are included in the charging and discharging region R3 (R3 in S901), the HVECU 90 determines that the first return condition is satisfied and selects the reduced guarantee mode (S905). S902 to S904 before S905 are similar to S604 to S607 (see FIG. 13) in the second embodiment. S906 and S909 are similar to S902.

When the magnitude of the allowable charging power Win and the magnitude of the allowable discharging power Wout are included in the charging and discharging region R2 (R2 in S901), the HVECU 90 determines that the second return condition is satisfied and selects the auxiliary constant power mode (S907).

When the magnitude of the allowable charging power Win and the magnitude of the allowable discharging power Wout are included in the charging and discharging region R1 ("OTHERS" in S901 and R1 in S908), the HVECU 90 determines that the third return condition is satisfied and selects the normal mode (S910).

When the magnitude of the allowable charging power Win and the magnitude of the allowable discharging power Wout are included in the charging and discharging region R4 ("OTHERS" in S901 and R4 in S908), the HVECU 90 causes the process to return to the main routine. In this case, none of the first to third return conditions are satisfied, and the control mode is not switched to any mode in which charging and discharging of the battery 10 is less reduced.

As described above, in the third embodiment, the HVECU 90 further has the reduced guarantee mode in which the HVECU 90 less strictly guarantees the requested driving force P* than in the normal mode. In the reduced guarantee mode, fluctuations in charging and discharging power of the battery 10 with fluctuations in engine power Pe are reduced by allowing to some extent an error in actual driving force from the requested driving force P* which occurs with fluctuations in engine torque Te. The battery 10 whose allowable charging power Win and allowable discharging power Wout are relatively severely limited can thus be more reliably protected.

The following aspect may also be used as a modification of the present disclosure. A hybrid vehicle according to another aspect of the present disclosure includes: an engine; a first rotating electrical machine; a second rotating electrical machine connected to drive wheels via an output shaft; a planetary gear set; a battery; a power converter configured to convert electric power among the battery, the first rotating electrical machine, and the second rotating electrical machine; a relay electrically connected between the battery and the power converter; an auxiliary load; a DC-to-DC converter electrically connected between the relay and the auxiliary load; and an auxiliary battery configured to supply electric power to the auxiliary load; and first and second controllers. The planetary gear set is configured to mechanically couple the engine, the first rotating electrical machine, and the output shaft and is configured to transmit torque among the engine, the first rotating electrical machine, and the output shaft. The first controller is configured to calculate allowable charging power of the battery and allowable discharging power of the battery and output the calculation results. The second controller has a constant voltage control mode in which the second controller performs constant voltage control of the DC-to-DC converter with the relay closed and a constant power mode in which the second controller performs constant power control of the DC-to-DC converter with the relay closed. The second controller is configured to select the constant power mode when at least one of the magnitude of the allowable charging power and the magnitude of the allowable discharging power becomes smaller than a predetermined value.

The following aspect may also be used as a modification of the present disclosure. A hybrid vehicle according to still another aspect of the present disclosure includes: an engine; a first rotating electrical machine; a second rotating electrical machine connected to drive wheels via an output shaft; a planetary gear set; a battery; a power converter configured to convert electric power among the battery, the first rotating electrical machine, and the second rotating electrical machine; a relay electrically connected between the battery and the power converter; an auxiliary load; a DC-to-DC converter electrically connected between the relay and the auxiliary load; an auxiliary battery configured to supply electric power to the auxiliary load; and first and second controllers. The planetary gear set is configured to mechanically couple the engine, the first rotating electrical machine, and the output shaft and is configured to transmit torque among the engine, the first rotating electrical machine, and the output shaft. The first controller is configured to calculate allowable charging power of the battery and allowable discharging power of the battery and output the calculation results. The second controller is configured to control the power converter according to the allowable charging power and the allowable discharging power received from the first controller. The second controller has a normal mode and a reduced guarantee mode. The normal mode is a mode in which the second controller guarantees that a driving force that is output from the hybrid vehicle is controlled to a requested driving force by adjusting torque of the engine, torque of the first rotating electrical machine, and torque of the second rotating electrical machine with the relay closed. The reduced guarantee mode is a mode in which the second controller less strictly guarantees that the driving force that is output from the hybrid vehicle is controlled to the requested driving force than in the normal mode with the relay closed. The second controller is configured to select the reduced guarantee mode when at least one of the magnitude of the allowable charging power and the magnitude of the allowable discharging power become smaller than a predetermined value.

The embodiments disclosed herein should be considered as illustrative in all respects and not as restrictive. The scope of the present disclosure is shown not by the above description of the embodiments but by the claims and is intended to include all modifications that are made without departing from the spirit and scope of the claims.

What is claimed is:

1. A hybrid vehicle, comprising:
   an engine;
   a first rotating electrical machine;
   a second rotating electrical machine connected to a drive wheel via an output shaft;
   a planetary gear set configured to mechanically couple the engine, the first rotating electrical machine, and the output shaft and transmit torque among the engine, the first rotating electrical machine, and the output shaft;
   a battery;
   a power converter configured to convert electric power among the battery, the first rotating electrical machine, and the second rotating electrical machine;
   a relay electrically connected between the battery and the power converter;
   an auxiliary load;
   a DC-to-DC converter electrically connected between the relay and the auxiliary load;
   an auxiliary battery configured to supply electric power to the auxiliary load;
   a first controller configured to calculate allowable charging power of the battery and allowable discharging power of the battery and output calculation results; and
   a second controller configured to control the engine and the power converter according to the allowable charging power and the allowable discharging power received from the first controller, the second controller having, as control modes, a normal mode in which the relay is closed and the battery and the power converter are electrically connected and a batteryless drive mode in which the relay is opened to cause the hybrid vehicle to move with the battery electrically disconnected from the power converter, and the second controller being configured to select the batteryless drive mode when at least one of magnitude of the allowable charging power and magnitude of the allowable discharging power become smaller than a first predetermined value, wherein
   the second controller is configured to perform constant voltage control of the DC-to-DC converter during the normal mode, and
   the second controller further has, as the control mode, a constant power mode in which the second controller performs constant power control of the DC-to-DC converter and is configured to select the constant power mode when at least one of the magnitude of the allowable charging power and the magnitude of the allowable discharging power becomes smaller than a second predetermined value that is equal to or larger than the first predetermined value.

2. The hybrid vehicle according to claim 1, wherein the second controller is configured to select the batteryless drive mode when at least one of the magnitude of the allowable charging power and the magnitude of the allowable discharging power become smaller than the first predetermined value due to a problem with communication between the first controller and the second controller.

3. The hybrid vehicle according to claim 1, wherein the second controller is configured to cancel the batteryless drive mode when all of following conditions are satisfied: it is no longer a case that at least one of the magnitude of the allowable charging power and the magnitude of the allowable discharging power are smaller than the first predetermined value, the hybrid vehicle is stopped, and an accelerator pedal of the hybrid vehicle is not being operated.

4. The hybrid vehicle according to claim 1, wherein the second controller is configured to guarantee during the normal mode that a driving force that is output from the hybrid vehicle is controlled to a requested driving force by adjusting torque of the engine, torque of the first rotating electrical machine, and torque of the second rotating electrical machine, and
   the second controller further has, as the control mode, a reduced guarantee mode in which the second controller less strictly guarantees that the driving force is controlled to the requested driving force than in the normal mode, and is configured to select the reduced guarantee mode when at least one of the magnitude of the allowable charging power and the magnitude of the allowable discharging power become smaller than a third predetermined value that is equal to or larger than the first predetermined value.

5. A drive control system configured to control traveling of a hybrid vehicle equipped with a battery, the hybrid vehicle including a first controller configured to calculate allowable charging power of the battery and allowable discharging power of the battery and output calculation results, the drive control system comprising:

an engine;
a first rotating electrical machine;
a second rotating electrical machine connected to a drive wheel via an output shaft;
a planetary gear set configured to mechanically couple the engine, the first rotating electrical machine, and the output shaft and transmit torque among the engine, the first rotating electrical machine, and the output shaft;
a power converter configured to convert electric power among the battery, the first rotating electrical machine, and the second rotating electrical machine;
a relay electrically connected between the battery and the power converter;
an auxiliary load;
a DC-to-DC converter electrically connected between the relay and the auxiliary load;
an auxiliary battery configured to supply electric power to the auxiliary load; and
a second controller configured to control the power converter according to the allowable charging power and the allowable discharging power received from the first controller, the second controller having, as control modes, a normal mode in which the relay is closed and the battery and the power converter are electrically connected and a batteryless drive mode in which the relay electrically connected between the battery and the power converter is opened to cause the hybrid vehicle to move with the battery electrically disconnected from the power converter, and the second controller being configured to select the batteryless drive mode when at least one of magnitude of the allowable charging power and magnitude of the allowable discharging power become smaller than a first predetermined value, wherein
the second controller is configured to perform constant voltage control of the DC-to-DC converter during the normal mode, and
the second controller further has, as the control mode, a constant power mode in which the second controller performs constant power control of the DC-to-DC converter and is configured to select the constant power mode when at least one of the magnitude of the allowable charging power and the magnitude of the allowable discharging power becomes smaller than a second predetermined value that is equal to or larger than the first predetermined value.

6. A method for controlling a hybrid vehicle, the hybrid vehicle including an engine, a first rotating electrical machine, a second rotating electrical machine connected to a drive wheel via an output shaft, a planetary gear set configured to mechanically couple the engine, the first rotating electrical machine, and the output shaft and transmit torque among the engine, the first rotating electrical machine, and the output shaft, a battery, a power converter configured to convert electric power among the battery, the first rotating electrical machine, and the second rotating electrical machine, a relay electrically connected between the battery and the power converter, an auxiliary load, a DC-to-DC converter electrically connected between the relay and the auxiliary load, an auxiliary battery configured to supply electric power to the auxiliary load, a first controller configured to calculate allowable charging power of the battery and allowable discharging power of the battery and output calculation results, and a second controller configured to control the engine and the power converter according to the allowable charging power and the allowable discharging power received from the first controller, the second controller being configured to perform normal control in which the relay is closed and the battery and the power converter are electrically connected, batteryless drive control in which the relay is opened to cause the hybrid vehicle to move with the battery electrically disconnected from the power converter, constant power control in which the second controller performs constant power control of the DC-to-DC converter, and constant voltage control of the DC-to-DC converter during the normal control, the method comprising:
performing the batteryless drive control by the second controller when at least one of magnitude of the allowable charging power and magnitude of the allowable discharging power become smaller than a first predetermined value; and
performing the constant power control by the second controller when at least one of the magnitude of the allowable charging power and the magnitude of the allowable discharging power becomes smaller than a second predetermined value that is equal to or larger than the first predetermined value.

\* \* \* \* \*